US011562641B1

(12) United States Patent
Kaufman et al.

(10) Patent No.: US 11,562,641 B1
(45) Date of Patent: Jan. 24, 2023

(54) SENSOR-BASED ITEM TRANSPORT SYSTEM

(71) Applicant: Amazon Technologies, Inc., Seattle, WA (US)

(72) Inventors: Seth R. Kaufman, Arlington, MA (US); Tim Martin, Andover, MA (US); Arianne Etta Spaulding, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 16/831,539

(22) Filed: Mar. 26, 2020

(51) Int. Cl.
| | | |
|---|---|---|
| *G01V 8/10* | (2006.01) | |
| *G08B 25/00* | (2006.01) | |
| *G01S 17/04* | (2020.01) | |
| *B65G 1/137* | (2006.01) | |
| *G01S 17/58* | (2006.01) | |
| *B65G 1/06* | (2006.01) | |
| *G01S 17/08* | (2006.01) | |
| *G05B 19/406* | (2006.01) | |
| *G05B 19/042* | (2006.01) | |
| *G05B 19/048* | (2006.01) | |
| *B25J 9/16* | (2006.01) | |
| *B65G 1/04* | (2006.01) | |

(52) U.S. Cl.
CPC .......... *G08B 25/008* (2013.01); *B25J 9/1676* (2013.01); *B25J 9/1697* (2013.01); *B65G 1/0492* (2013.01); *B65G 1/065* (2013.01); *B65G 1/1375* (2013.01); *G01S 17/04* (2020.01); *G01S 17/08* (2013.01); *G01S 17/58* (2013.01); *G01V 8/10* (2013.01); *G05B 19/048* (2013.01); *G05B 19/0425* (2013.01); *G05B 19/406* (2013.01)

(58) Field of Classification Search
CPC .......... G01S 17/04; G01S 17/08; G01S 17/58; B65G 1/0492; B65G 1/065; B65G 1/1375; B25J 9/1676; B05B 19/0425; B05B 19/048; B05B 19/406; G01V 8/10; G08B 25/008

See application file for complete search history.

(56) References Cited

U.S. PATENT DOCUMENTS

| | | | | |
|---|---|---|---|---|
| 10,503,143 B1 * | 12/2019 | Polic | ................. | G05B 19/406 |
| 2016/0062345 A1 * | 3/2016 | Stubbs | ................. | B25J 5/00 |
| | | | | 701/2 |

* cited by examiner

*Primary Examiner* — Kevin K Pyo
(74) *Attorney, Agent, or Firm* — Lee & Hayes, P.C.

(57) ABSTRACT

A sensor-based item transport system, and a method therefore are described. The system includes, for example, a cart station, within a restricted area including a plurality of automated drive. A light curtain is adjacent to the cart station. A first sensor and a second sensor are spaced apart from the first sensor within the cart station. A first mode associated with the light curtain is maintained causing an alarm system associated with the light curtain to remain armed. The first mode is caused to change to a second mode associated with the light curtain, the second mode causing the alarm system to be muted, based at least in part on the identity of the cart. The identity is determined based at least in part on one or more signals received from the first sensor and the second sensor.

20 Claims, 9 Drawing Sheets

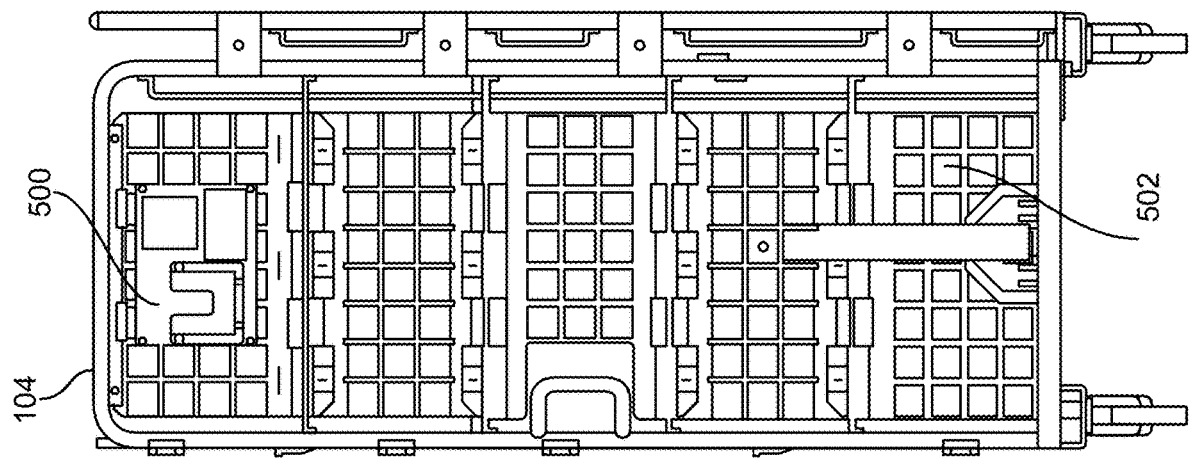
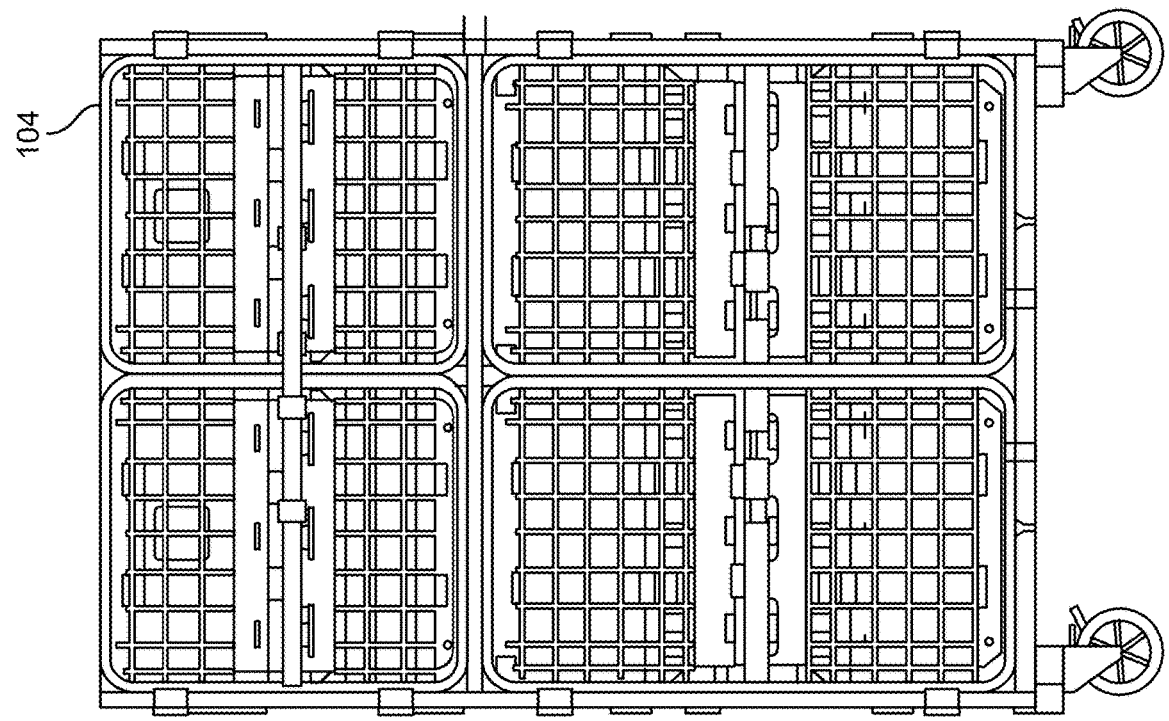
FIG. 5

800

```
┌─────────────────────────────────────────────────────────────┐
│ Maintaining a first mode associated with a light curtain    │
│ adjacent to a cart station, the first mode causing an alarm │
│ system associated with the light curtain to remain armed    │
│                            802                              │
└─────────────────────────────────────────────────────────────┘
                              │
                              ▼
┌─────────────────────────────────────────────────────────────┐
│ Receiving one or more first signals from a first sensor and │
│ a second sensor, the one or more first signals indicating   │
│ detection of a cart moving out of the cart station and into │
│ the unrestricted area                                       │
│                            804                              │
└─────────────────────────────────────────────────────────────┘
                              │
                              ▼
┌─────────────────────────────────────────────────────────────┐
│ Determining, based at least in part on the one or more      │
│ first signals, an identity of the cart                      │
│                            806                              │
└─────────────────────────────────────────────────────────────┘
                              │
                              ▼
┌─────────────────────────────────────────────────────────────┐
│ Receiving, one or more second signals from the first sensor │
│ and the second sensor, the one or more second signals       │
│ indicating that the cart has passed through the light       │
│ curtain and is outside of the cart station                  │
│                            808                              │
└─────────────────────────────────────────────────────────────┘
                              │
                              ▼
┌─────────────────────────────────────────────────────────────┐
│ Causing, based at least in part on the one or more second   │
│ signals, the second mode to change to the first mode        │
│                            810                              │
└─────────────────────────────────────────────────────────────┘
```

FIG. 8

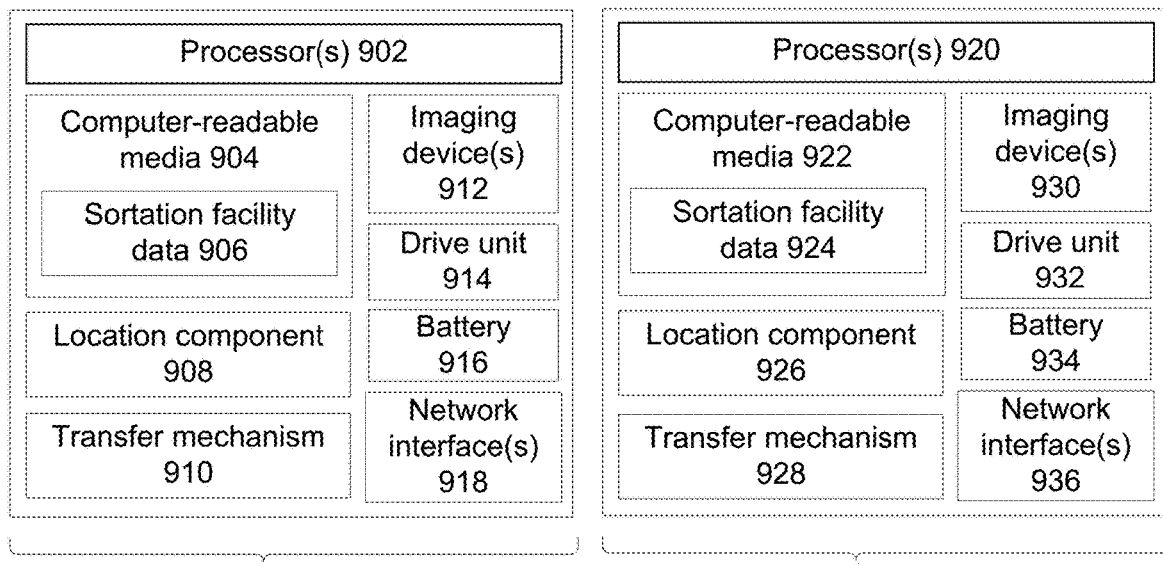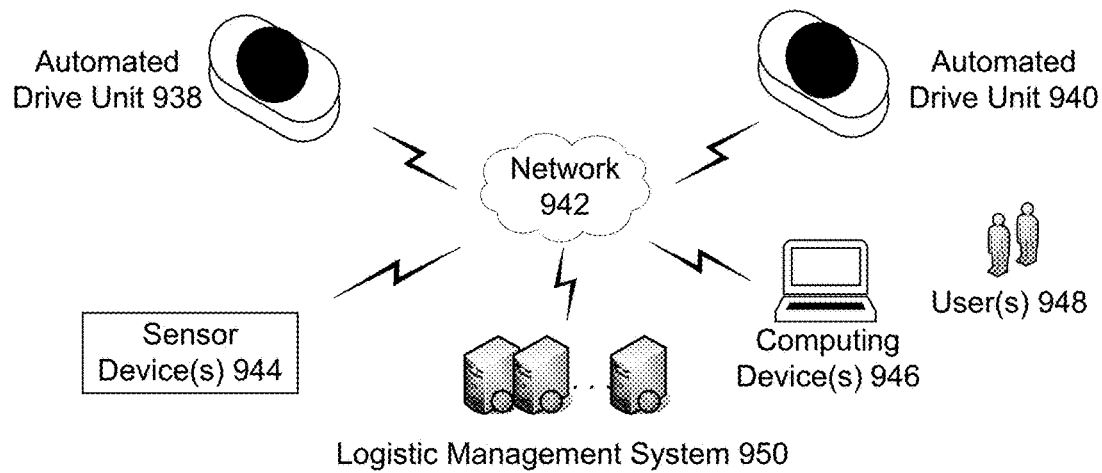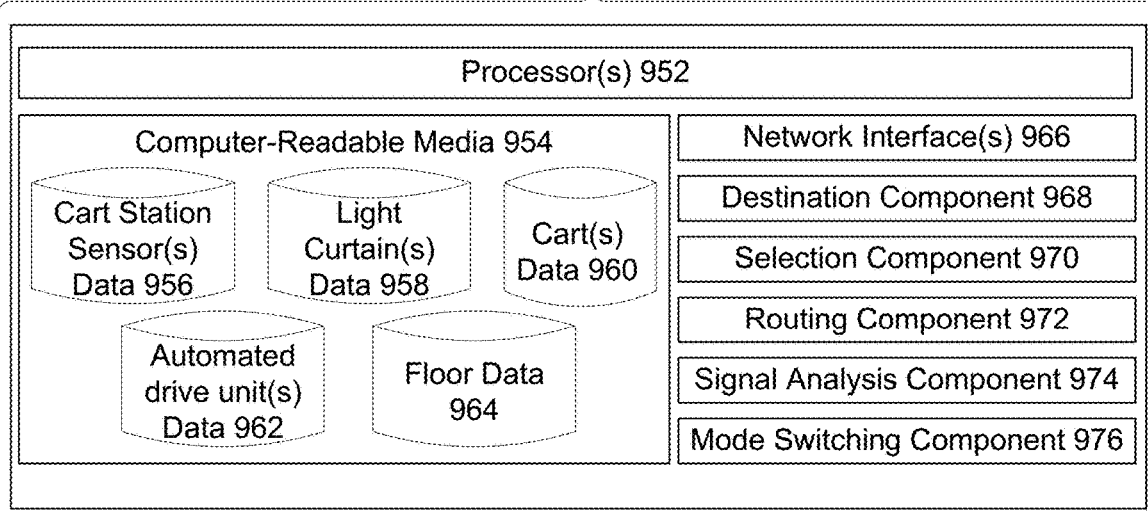
FIG. 9

SENSOR-BASED ITEM TRANSPORT SYSTEM

BACKGROUND

Modern shipment systems, such as those in sort systems, mail order warehouses, supply chain distribution centers, airport luggage systems, and custom-order manufacturing facilities, often utilize mobile robotic devices to move items and/or storage containers within a workspace. Coordinating tasks between the various components of these systems can be cumbersome. As shipment systems grow, the challenges of simultaneously completing a large number of relocating, storing, and other shipment-related tasks utilizing these components becomes non-trivial. In systems tasked with responding to large numbers of diverse task requests, inefficient utilization of system resources, including space and equipment can result in lower throughput, unacceptably long response times, an ever-increasing backlog of unfinished tasks, and, in general, poor system performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 5 illustrates an example cart in a two-dimensional view, according to an embodiment of the present disclosure.

FIG. 8 illustrates an example process for instructing automated drive units to sort carts, according to an embodiment of the present disclosure.

FIG. 9 is an example system architecture for a system for implementing aspects of the workspace of FIG. 1, according to an embodiment of the present disclosure.

DETAILED DESCRIPTION

Figure 1:
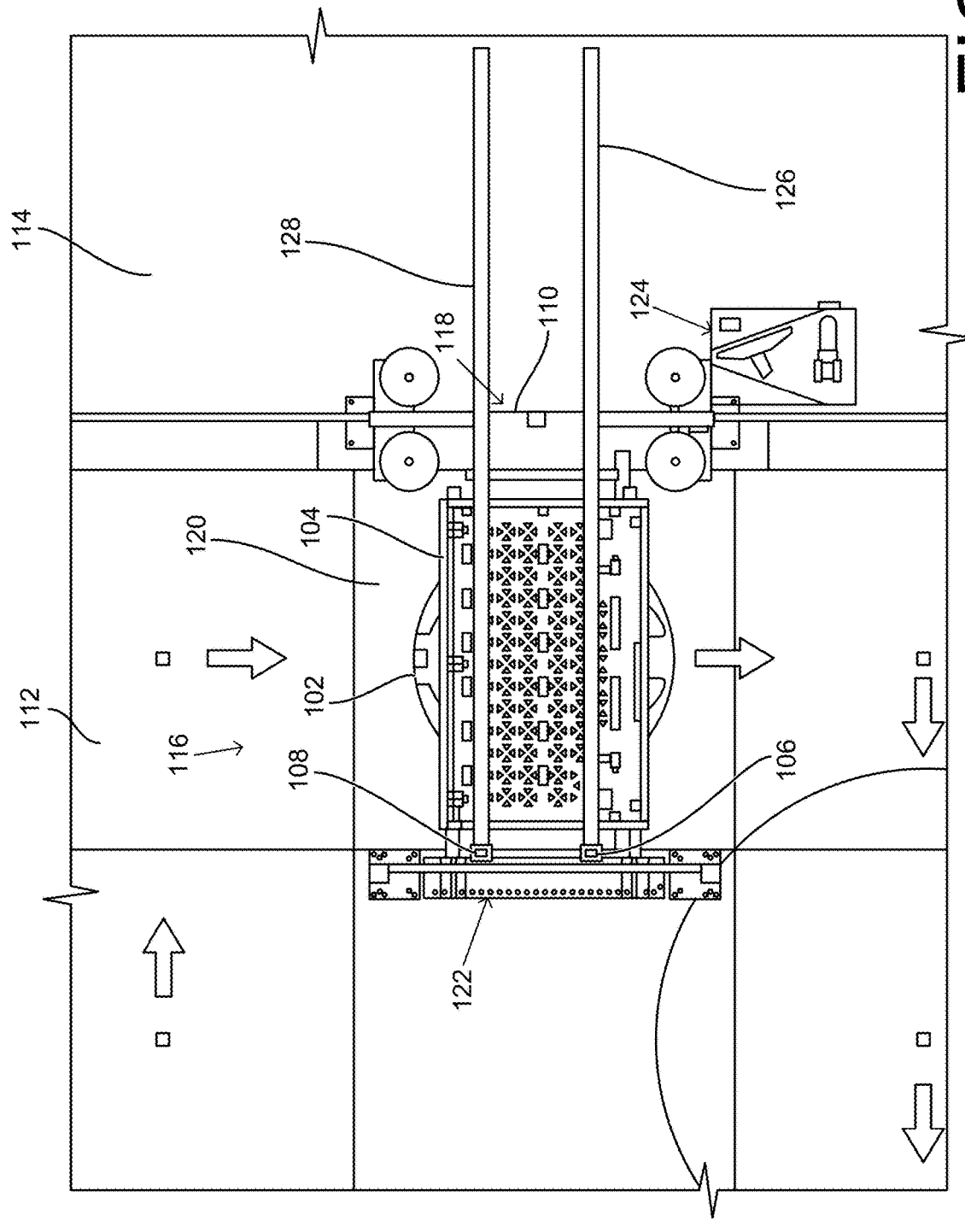
FIG. 1 illustrates an example workspace including a cart, an automated drive unit, and a cart station that is located between a restricted area and an unrestricted area, according to an embodiment of the present disclosure.

Discussed herein are systems and methods for moving item transport mechanisms within a workspace. In some embodiments, the systems and methods may be implemented or find use in a system (e.g., an item sort system or item shipment system) for coordinating movements between components of a workspace. In some embodiments, automated drive units or other automated machines in a restricted area of the workspace may move item transport mechanisms that are being transferred between the restricted area and an unrestricted area. The workspace may further include one or more item transport stations located between the restricted area and the unrestricted area, or within the restricted area and adjacent to the unrestricted area. The item transport stations may be any structure that can transport items/packages between different locations, such as carts, pods, wagons, racks, etc. The item transport stations (e.g., cart stations) may include interaction areas (also referred to as "bays") within which one or more tasks (e.g., stowing item transport mechanisms, retrieving item transport mechanisms, etc.) may be performed (e.g., by operators of the item transport stations). Interaction areas of cart stations may provide access from the unrestricted area to the restricted area. The automated drive units may enter the interaction areas and move the item transport mechanisms (e.g., carts) that are delivered by operators to the cart stations and from the unrestricted area. The automated drive units may transport the carts from the cart stations through the restricted area to a location associated with a destination of the cart (e.g., a location from which the carts, and/or the items in which the carts are transporting, are loaded into shipping vehicles). In some embodiments, the automated drive units may deliver carts that arrive at locations in the workspace (e.g., carts that are delivered by shipping vehicles) to the cart stations. Therein, automated drive units may move the carts from a location at which the carts arrive (e.g., a location at which the carts are unloaded from shipping vehicles) to the cart stations, via the restricted area. The automated drive units may deposit the carts into specific cart stations associated with destinations of the carts.

In some embodiments, the interaction areas may include access points. As a non-limiting example, an access point (e.g., an opening or entryway at one side of a cart station facing a floor of the workspace) of an interaction area may be configured to receive a cart. The cart received at the access point may be delivered to, or picked up at, the interaction area by an automated drive unit. This access point may, in some embodiments, include a light curtain generated by any suitable number of light emitters and receivers. The light curtain may be positioned in any suitable fashion to cover any suitable portion of the access point. For example, the light curtain may cover a space spanning the width of the access point from the floor to some threshold height.

In some embodiments, the workspace may include a logistic management system in communication with the various components of the cart station. The logistic management system may be configured to monitor light curtains situated at access points of interaction areas of cart stations. This monitoring may occur even during times when the cart stations are not actively being utilized by operators. In some embodiments, such monitoring may commence in response to indications that the cart stations and/or interaction areas are in use. By way of example, in response to receiving an indication that a cart station is in use, or at any suitable time (e.g., upon powering on), the logistic management system may receive light curtain data from a light receiver of a light curtain. The logistic management system may be configured to communicate with a computing device associated with the cart station to perform a variety of operations related to coordinating tasks between an operator of the cart station and one or more automated drive units, and/or coordinating movement of automated drive units near the cart station and/or within the interaction area.

In operation, an operator (e.g., user) of the cart station may connect with the logistic management system of the workspace by utilizing the computing device. The logistic management system may be configured to assign tasks, determine instructions and/or routes to perform those tasks, and communicate with the automated drive units, the computing devices, and/or user devices operated by personnel within the workspace to effectuate the completion of those tasks. In some embodiments, the operator of the cart station may provide user credentials (e.g., username and/or password, identification information, etc.) via an input device of the computing device (e.g., a keyboard, an RFID reader, a barcode reader, etc.). The operator may be authenticated and logged onto the computing device. Using an interface provided by the computing device, the operator may select a type of task or a particular task and/or provide an indication that the operator is available for task assignment. In response, the logistic management system may assign the operator/station one or more tasks within the system (e.g., moving carts from the unrestricted area and into the interaction area, or moving carts out of the interaction area and into the unrestricted area). Additionally, the logistic management system may assign one or more automated drive units task assignments that correspond to conveying one or more carts to and/or from the cart station in accordance with the tasks assigned to the operator/cart station. The operator may transmit, via the computing device, a request to the logistic management system to place the cart station in a ready (e.g., operational) state, and proceed to perform the one or more tasks assigned to the operator/station. While the cart station is operating in the ready state, the logistic management system may be configured to permit movement of automated drive units without restrictions to normal operation of the automated drive units.

In some embodiments, the logistic management system may detect breaches of the light curtain. Should an object (e.g., a cart, an operator, an automated drive unit, an object of another type, etc.) traverse through the light curtain, the breach may be detected. As a non-limiting example, one or more receivers corresponding to one or more light emitters of the light curtain may generate light curtain data indicating that light from one or more corresponding light emitters is not received. The logistic management system, upon detecting the breach may determine when activities are taking place within the access point. For example, the breach of the light curtain may be detected while the cart is exiting the interaction area and being moved (e.g., manually pulled/pushed, or electronically/remotely controlled to move) out of the cart station by an operator. In another example, the breach of the light curtain may be detected while the cart is entering the interaction area and being pushed into the cart station by the operator. In another example, the breach of the light curtain may be detected while the cart is motionless and located partially, or completely, in the interaction area. In another example, the breach of the light curtain may be detected while there is no cart located either partially or completely in the interaction area (e.g., while there is no cart being moved out of, or into, the cart station). The object may be detected via the light curtain based at least in part on light emitted by one or more light emitters being blocked by the object. The one or more light receivers that do not receive the light that is blocked may transmit, to the logistic management system, light curtain data indicating that the light is not received by the one or more light receivers.

By way of example, the logistic management system may monitor for breaches of the light curtain. For example, should the object traverse through the light curtain, the breach may be detected in the manner described above. The logistic management system, upon detecting a breach of the light curtain while the cart station is operating in the ready state may immediately transition the cart station to a breach state.

While the cart station is operating in this breach state, the logistic management system may trigger an alarm system associated with the light curtain. As a non-limiting example, the logistic management system may cause an indicator device associated with the cart station to display (and/or sound) an indication of the cart station being in the breach state. For example, the logistic management system may transmit any suitable data to cause the indicator device to display a red light at one or more areas. As a specific example, the indicator device may present red light utilizing a top area, a middle area, and a bottom area of the indicator device.

In some embodiments, the logistic management system may further be configured with a network interface (e.g., an interface including a wireless communications transmitter device) configured for short-range wireless communications. By way of example, the network interface may be configured to transmit a short-range radio signal. In some embodiments, each automated drive unit operating within the workspace may include a receiver configured to receive these short-range signals. In at least one embodiment, receipt of the signal and/or any suitable data transmitted by the network interface may cause movement of a receiving automated drive unit to be altered or changed (e.g., halted, slowed, rerouted, or reversed). Due to the short range nature of the signal, this may cause movement of automated drive units within a threshold distance of the computing device and/or the cart station (e.g., located at or near the interaction area etc.) to be altered or changed (e.g., halted, slowed, rerouted, or reversed), while any remaining automated drive units operating outside the threshold distance may proceed with their assigned tasks without interruption.

An alarm system for a cart station that is armed (e.g., active or being in a monitored state) and triggered may be used to alter or change movement of receiving automated drive units. The alarm system provides increased safety for operators of the cart stations. The light curtain, and the alarm system that may be triggered when the light curtain is breached, reduce the likelihood of operators being injured by the carts and/or the automated drive units. The altering or changing of the movement of automated drive units helps prevent collisions of operators, carts, and/or automated drive units.

In a scenario in which the cart station being in a breach state is reached, the logistic management system may be configured to continually and/or periodically transmit the short-range signal for the duration of operation of the cart station in the breach state. Subsequently, the operator and/or an authorized user (e.g., a manager associated with higher authority credentials) may provide an electronic override via user input provided at the computing device. Alternatively, the computing device itself may include an input mechanism (e.g., a scanner, keyboard, mechanical key) with which an override/reset intent may be entered. Upon receiving an indication of override/reset, the logistic management system may be configured to cease transmission of the short-range signal and transition back to a ready state. While operating the cart station in the ready state, the logistic management system may transmit data to the indicator device to update the provided indication of current state operation of the cart station (e.g., transmit back to displaying the green area as discussed above). In some embodiments, the indication of the override/reset may only be performed from a position within the workspace that is outside the cart station or interaction area.

In some embodiments, the cart stations may include back fence areas that are positioned in the interaction areas opposite to the access points. As a non-limiting example, a back fence area of an interaction area (e.g., an interior surface of the back fence area) may be include a plurality of sensors that are positioned at, and/or attached to, the back fence area. A cart station and/or a computing device may include a button used by an operator of the cart station to control operations of the cart station. The plurality of sensors may detect objects (e.g., a cart, an operator, an automated drive unit, an object of another type, etc.) that are located in front of the plurality of sensors and/or movement of the objects in front of the plurality of sensors. In some embodiments, each of the plurality of sensors may be a red laser light sensor, an infrared (IR) laser light sensor, an IR light emitting diode (LED) sensor, or any other type of sensor that is configured to detect objects, and the movement thereof. By way of example, the plurality of sensors may be the same type or different types from one another. For example, the plurality of sensors may include a first sensor configured to scan a first area of a boundary region of the cart station, and a second sensor configured to scan a second area of the boundary region of the cart station, where a first size of the first area is different from a second size of the second area. By using the plurality of sensors to detect movements of carts, sequences of events corresponding thereto are able to be more effectively tracked, the capability of detection of errors/malfunctions of the sensors is increased, the safety of operators of cart stations is increased, the total area of the workspace that must be monitored is decreased, the detection speed required for monitoring cart movement is decreased, the data that is to be acquired to track the carts is decreased to an amount that is more efficient and effective with respect to the processing/storing capabilities of hardware of the system, and the cost of hardware components including processors used to operate the system is decreased.

In some embodiments, the plurality of sensors may include a first sensor and a second sensor. The second sensor may be spaced apart from the first sensor within the cart station. The first sensor may be positioned at a first portion (e.g., a left side or a right side) of the back fence area. The second sensor may be positioned at a second portion (e.g., a right side corresponding to the first sensor being positioned at the left side, or a left side corresponding to the first sensor being positioned at the right side) of the back fence area. The first sensor and the second sensor may be positioned at different heights. For example, the first sensor may be positioned higher than the second sensor, or vice versa. As a non-limiting example, a height of the first sensor may be substantially the same as a height of a first solid surface of a side of a cart to be moved into, or out of, a cart station and/or a height of the second sensor may be substantially the same as a height of a second solid surface of a side of a cart to be moved into, or out of, a cart station. The first solid surface of the side of the cart may have a width that is less than a width of the second solid surface of the cart. A first solid surface of the side of the cart may have a height that is greater than a height of the second solid surface of the cart.

In some embodiments, the first sensor and the second sensor may detect movement of a cart as the cart moves out of the interaction area of the cart station and moves away from the restricted area and toward the unrestricted area. As a non-limiting example, the first sensor and the second sensor may detect movement of cart as the cart approaches the interaction area of the cart station and moves toward the restricted area and away from the unrestricted area. The first sensor and the second sensor may determine an identity of the cart based at least in part on the movement of the cart being detected. The first sensor and the second sensor may send sensor data to the logistic management system. By way of example, if the movement of the cart is detected by the first sensor and the second sensor, the first sensor and the second sensor may send sensor data indicating detection of the movement of the cart. By way of another example, if the first sensor and the second sensor detect that there is no movement by any cart, the first sensor and the second sensor may send sensor data indicating detection of no movement by any cart.

In some embodiments, the logistic management system may control the alarm system associated with the light curtain based on a first mode and a second mode. The logistic management system may provide a first mode for the cart station causing the alarm system associated with the light curtain to be armed, and a second mode for the cart station causing the alarm system to be muted (e.g., inactive, disarmed, or not being monitored). When the alarm system is armed, breach of the light curtain would trigger the alarm system (e.g., activation of one or more alarms (e.g., alarm devices) including a siren, lights, etc.) and, when the alarm system is muted, the alarm system will not be triggered when the light curtain is breached.

In some embodiments, the cart stations (e.g., the computing devices) may include buttons used by operators in combination with the sensor data to control the alarm system. As a non-limiting example, a signal may be sent from a computing device to the logistic management system as a result of an operator pressing a button of the computing device. By way of example, the logistic management system may change a second mode associated with a light curtain of cart station to a first mode after a cart is moved by the operator from the unrestricted area and into the interaction area, based at least in part on the operator pressing the button. By way of another example, the logistic management system may change the first mode associated with the light curtain of cart station to the second mode before a cart is moved by the operator from the interaction area and into the unrestricted area, based at least in part on the operator pressing the button.

In some embodiments, operators may transmit indications (e.g., via the computing devices) to the logistic management system to use cart stations for unloading and/or loading carts. While using a cart station to load a cart, the logistic management system may maintain the first mode associated with the light curtain if the sensor data indicates detection of no movement by any cart. The logistic management system may change between the first mode associated with the light curtain and the second mode based at least in part on a combination of the light curtain data and the sensor data. For example, the alarm system associated with the light curtain may be initially armed while the light curtain data indicates that the cart station is in a ready state and the cart station is in the first mode, based at least in part on the sensor data indicating detection of no movement of any cart.

The logistic management system may change from the first mode to the second mode if the light curtain data indicates that the cart station is in a ready state, and if the sensor data indicates that the cart is moving from the unrestricted area toward the cart station. The alarm system associated with the light curtain may be changed from armed to muted while the light curtain data indicates that the cart station is in a breach state, based at least in part on the first mode being changed to the second mode. For example, the logistic management system may change from the first mode to the second mode based at least in part on a combination of the light curtain data and the sensor data indicating that the cart has is moving toward the interaction area, and if a distance between the cart and the first sensor or the second sensor is less than, or equal to, a threshold distance (e.g., a threshold distance corresponding to the cart being completely outside of the interaction area).

At a subsequent time, the logistic management system may change from the second mode and to the first mode if the light curtain data causes the cart station to operate in the ready state, if the sensor data indicates that a distance between the cart and the first sensor and the second sensor is less than a threshold distance (e.g., a threshold distance corresponding to the cart being completely inside the interaction area), and if the button is pressed by the operator. By way of example, the sensor data used to indicate that the cart is moving from the unrestricted area and into the interaction area may indicate that a distance between the first sensor and the cart is substantially the same as between the second sensor and the cart. By comparing the distance between the first sensor and the cart and the distance between the second sensor and the cart, the logistic management system may determine that the cart, and not another object that does not have a flat surface, is being moved into the interaction area.

While using the cart station to unload a cart, the logistic management system may maintain the first mode associated with the light curtain if the sensor data indicates detection of no movement by any cart. The alarm system associated with the light curtain may be initially armed if the light curtain data indicates that the cart station is in the ready state and the cart station is in the first mode associated with the light curtain, based at least in part on the sensor data indicating detection of no movement of any cart.

The logistic management system may change between the first mode associated with the light curtain and the second mode based at least in part on a combination of the light curtain data and the sensor data, and further based at least in part on the button. By way of example, the logistic management system may change from the first mode to the second mode if the light curtain data indicates that the cart station is in the ready state, if the sensor data indicates that a distance between a cart located in the cart station and the first sensor and/or the second sensor is less than, or equal to, the threshold distance corresponding to the cart being completely inside the interaction area, and if the logistic management system determines that a distance between an automated drive unit that unloaded the cart and the cart station (e.g., a nearest portion of a perimeter of the cart station to the automated drive unit) is greater than, or equal to, a threshold distance. By way of another example, the logistic management system may change from the first mode to the second mode if the light curtain data indicates that the cart station is in the ready state, if the sensor data indicates that the distance between the cart located in the cart station and the first sensor and/or the second sensor is less than, or equal to, the threshold distance corresponding to the cart being completely inside the interaction area, if the logistic management system determines that the distance between the automated drive unit that unloaded the cart and the cart station is greater than, or equal to, a threshold distance, and if the button is pressed by the operator. The alarm system associated with the light curtain may be changed from armed to muted, based at least in part on the cart station being in the second mode. For example, the alarm system associated with the light curtain may be changed from armed to muted, based at least in part on the cart station being in the second mode, and regardless of the light curtain data indicating that the cart station is in the breach state while the cart is moved out of the interaction area.

At a subsequent time, the logistic management system may change from the second mode to the first mode based at least in part on a combination of the light curtain data and the sensor data indicating that the cart has passed through the light curtain (e.g., the cart is positioned completely outside of the interaction area). For example, the logistic management system may change from the second mode to the first mode if the light curtain data causes the cart station to operate in the ready state, and if the sensor data indicates that a distance between the cart and the first sensor and the second sensor is greater than the threshold distance corresponding to the cart being completely outside of the interaction area. By way of example, the sensor data used to indicate that the cart is moving from the interaction area and into the unrestricted area may indicate that a distance between the first sensor and the cart is substantially the same as between the second sensor and the cart. By comparing the distance between the first sensor and the cart and the distance between the second sensor and the cart, the logistic management system may determine that the cart, and not another object that does not have a flat surface, is being moved into the unrestricted area.

In some embodiments, while using the cart station to unload or load a cart, the sensor data may compare an offset (e.g., 10 cm) of a distance between the first sensor and the cart relative to a distance between the second sensor and the cart, or vice versa. By using the offset, the logistic management system may avoid false readings due to shorts in wiring for the first sensor and/or the second sensor, or due to shorts in a control box to which wiring for the first sensor and/or the second sensor are coupled.

It should be appreciated that the techniques discussed above are applicable in contexts other than sorting situations. Utilizing the techniques discussed herein, coordination within the sort system is improved by ensuring that operators are restricted from accessing an interaction area during times at which movement may be occurring and/or the interaction area may be in use (e.g., by an automated drive unit). Additionally, or alternatively, by utilizing the logistic management system, the system may ensure that breaches of the light curtain are detected while an operator is located in the interaction area. Should a breach occur during this time, the short-range nature of the signal provided by the controller device may halt nearby automated drive units to ensure efficient use of the workspace and an increase in throughput during such instances. Rather than shutting down an entire floor due to a breach being detected, one or more remedial actions (e.g., the halting of one or more automated drive units) may be localized to affect only components located within a threshold distance of the breach. As yet another enhancement, once a cart is placed at the interaction area, the logistic management system may further improve coordination within the cart station by ensuring that the cart may not be moved while it is being accessed by an operator. Any suitable combination of the above improvements can lead to a more efficient use of a workspace and/or increased throughput of the system as a whole.

FIG. 1 illustrates an example workspace 100 including a cart 104 (also referred to herein as an "item transport mechanism"), an automated drive unit 102 (an example of automated drive unit 938 or automated drive unit 940 described below in connection with FIG. 9), and a cart station 116 that is located between a restricted area 112 and an unrestricted area 114, according to an embodiment of the present disclosure. A workstation 100 may be configured in any suitable matter and may span any suitable area of any suitable dimensions.

In some embodiments, the workstation 100 may include any suitable number of components such as computing device 124. Computing device 124 (an example of computing device(s) 946 described below in connection with FIG. 9) may be configured to manage task assignment and/or completion of tasks within workstation 100. In some embodiments, the computing device 124 may include any suitable user interfaces and/or input/output devices to enable an operator to sign in to the computing device 124. In some embodiments, the computing device 124 may be configured to communicate with the logistic management system 950 of FIG. 9 to receive task assignments and/or transmit requests to move an automated drive unit into and out of the interaction area. The computing device 124 may be configured to transmit any suitable data indicating an operating state of the cart station 116 to the logistic management system 950.

In some embodiments, the workspace 100 may include one or more cart stations (e.g., the cart station 116), which may include an interaction area (e.g., interaction area 120). In some embodiments, the interaction area 120 may be controlled via the computing device 124, multiple corresponding controller devices, and/or the logistic management system 950. In some embodiments, the computing device 124 may be configured to communicate with any suitable component of the cart station 116.

In some embodiments, the interaction area 120 may be separated from the unrestricted area 114 via an access point 118. In some embodiments, the access point 118 may be utilized for operator access and/or to place the cart 104 within the storage container and/or on the automated drive unit 102 located within the interaction area 120.

In some embodiments, the cart station 116 may include a back fence area 122. The cart station 116 may include a plurality of sensors (e.g., a first sensor 106 and a second sensor 108, which are examples of sensor(s) 944 described below in connection with FIG. 9). The first sensor 106 and the second sensor 108 may sense objects via a first sensor stream 126 and a second sensor stream 128. The first sensor 106 and the second sensor 108 may be positioned at, and/or attached to, the back fence area 122, or at any other location associated with the cart station 116. The first sensor 106 and the second sensor 108 may detect objects on each side of the access point 118, within the interaction area 120, within the restricted area 112, and/or within the unrestricted area 114.

In some embodiments, the first sensor 106 and the second sensor 108 may be placed at predetermined locations and/or at a predetermined spacing from one another. As a non-limiting example, the first sensor 106 may be positioned at a left side of the back fence area 122. The second sensor 108 may be positioned at a right side of the back fence area 122. The exact number of sensors and/or placement location(s) of these sensors within the interaction area may vary. For example, the first sensor 106 and the second sensor 108 may be positioned at different heights. The first sensor 106 may be positioned higher than the second sensor 108. As a non-limiting example, a height of the first sensor 106 may be substantially the same as a height of a first solid surface (an example of first solid surface 500 described below in connection with FIG. 5) of a side of the cart 104. A height of the second sensor 108 may be substantially the same as a height of a second solid surface (an example of second solid surface 502 described below in connection with FIG. 5) of a side of the cart 104. The first solid surface of the cart 104 may have a width that is less than a width of the second solid surface of the cart 104. The first solid surface of the cart 104 may have a height that is greater than a height of the second solid surface of the cart 104.

In some embodiments, the cart station 116 may include sensors (e.g., motion sensors, noise sensors, heat sensors, pressure sensors, etc.) that sense objects passing between the unrestricted area 114 and the restricted area 116 (e.g., through the access point 118). By way of example, the access point 118 may include a light curtain (e.g., light curtain 110) that is configured to entirely or partially span the area of the access point 118. The light curtain 110 may be generated by any suitable number and type of light emitters and receivers. In some embodiments, the light emitters may each produce light aimed at a corresponding light receiver. Each light receiver may be configured to receive light from a corresponding light emitter. Each pair of light emitters/receivers may be spaced at any suitable distance from one another to cover any suitable area of the access point 118. It should be appreciated that any access point of an interaction area may include a similar light curtain. In some embodiments, the light curtain 110 may span the width of the access point 118 from the floor to a threshold height to be configured to detect the cart 104 entering or exiting the interaction area 120. By way of example, the sensors (e.g., the first sensor 106, the second sensor 108, and/or the light emitters and receivers of the light curtain 110) may remain armed and are constantly providing data/signals to a back end system (e.g., the logistic management system 950) so that the logistic management system 950 can continuously monitor whether objects are moving towards/away from the cart stations 116 and whether objects are moving into and out of the cart stations 116.

By way of example, the cart station 116 may be used for transferring objects (e.g., cart 104) from the restricted area 112 and to the unrestricted area 114, and vice versa. The cart station 116 may be used by an operator of the cart station 116. The cart station 116 may provide a safe space in which the operator may work. The cart station 116 may include the access point 118 through which the operator may move, to enter or exit the cart station 116. For example, the operator may move an object (e.g., manually pull/push a cart 104, or electronically/remotely control the cart 104 to move) out of the cart station 116 or move an object (e.g., manually push/pull the cart 104, or electronically/remotely control the cart 104 to move) into the cart station 116. The cart station 116 may monitor whether an object (e.g., the operator) is inside of the cart station 116 and an alarm system of the cart station 116 may be triggered if the operator is determined to be inside of the cart station 116 (e.g., inside of the interaction area 120). For example, the operator of the cart station 116 may be determined to be inside of the interaction area 120 based at least in part on at least one of light curtain data received from the light curtain 110, sensor data received from the sensor 106, and/or sensor data received from the sensor 108.

In some embodiments, one or more operations may be performed based at least in part on a determination that an object (e.g., an operator, a cart, an automated drive unit, etc.)

is partially or completely inside of the interaction area 120. For example, an operation may be performed if an object is determined to be unexpectedly inside of the interaction area 120 thereby causing a potential safety problem and/or interruption of operation of the cart station 116 (e.g., the object is inside of the interaction area 120 while the interaction area 120 is empty, while an automated drive unit is attempting to enter the interaction area 120 to deliver or pick up a cart, while the operator is attempting to move the cart 104 (e.g., manually push/pull the cart 104, or electronically/remotely control the cart 104 to move), out of the interaction area 120, and/or while the a cart is being moved (e.g., manually pushed/pulled, or electronically/remotely controlled to move) into the interaction area 120).

By way of example, an operation that is performed may include altering or changing (e.g., halting, slowing, rerouting, or reversing) movement of one or more automated drive units (e.g., automated drive unit 102). By way of another example, an operation that is performed may include causing a light device to emit light (e.g., colored (e.g., red or yellow) light, flashing or blinking lights, etc.) at one or more areas in and/or near the cart station to be emitted. By way of another example, an operation that is performed may include causing a sound device to emit an audible alarm. By way of another example, an operation that is performed may include barring access in and/or out of the interaction area 120 (e.g., automatically shutting a sliding or swinging door of the access point 118 and/or extending objects such as one or more beams, a gate, a fence etc. across the access point 118).

In some embodiments, the restricted area 112 may be used for transporting one or more automated drive units (e.g., automated drive unit 102) to and from cart stations (e.g., cart station 116). The automated drive units may enter the cart stations to load or unload carts (e.g., cart 104). By way of example, an automated drive unit 102 may be automatically operated to move through the restricted area 116, enter the cart station 116, load a cart (e.g., the cart 104) that is moved (e.g., manually pushed/pulled, or electronically/remotely controlled to move) into the cart station 116 by the operator, and transport the cart 104 to another part of the restricted area 112. By way of another example, the automated drive unit 102 may be automatically operated to move through the restricted area 116, enter the cart station 116, unload a cart (e.g., the cart 104) into the cart station 116 by the operator, and exit the cart station 116. Because the restricted area 112 may be used for movement of a large number of heavy components (e.g., automated drive units transporting or not transports carts), access to the restricted area 112 is controlled to prevent personal/bodily injury and/or interruption of operation of the workspace 100.

In some embodiments, the unrestricted area 114 may be used by operators of cart stations. By way of example, an operator of the cart station 116 may move carts (e.g., manually pull/push a cart 104, or electronically/remotely control the cart 104 to move), out of the cart station 116 into the unrestricted area 114 or move carts (e.g., manually push/pull the cart 104, or electronically/remotely control the cart 104 to move) out of the unrestricted area 114 into the cart station 116. The operator may use the computing device 124 and/or the logistic management system 950 to control operation of various components and/or machinery related to operation of the cart station 116. The operator may use the unrestricted area 114 to manually and/or remotely load and/or move carts. For example, the carts be automated and/or controlled by the operator to move in or out of the cart station 116, via the computing device 124 and/or the logistic management system 950.

In some embodiments, to load carts onto automated drive units, operators may fill and/or move the carts through the unrestricted area 114 and toward the cart stations. For example, the operator of the cart station 116 may fill the cart 104 with products or select the cart 104 already having been filled with products, move the cart 104 through the unrestricted area 114 and toward the cart station 116, and move the cart 104 (e.g., manually push/pull the cart 104, or electronically/remotely control the cart 104 to move) through the access point 118 (e.g., through the light curtain 110) and into the cart station 116 (e.g., into the interaction area 120). After the operator is completely out of the cart station 116 and inside of the unrestricted area 114, the automated drive unit 102 may move into the cart station 116, load the cart 104 by lifting the cart 104, and move the cart 104 out of the cart station 110 and through the restricted area 112. For example, the automated drive unit 102 that loads the cart 104 may move in the direction of the arrows shown in FIG. 1.

In some embodiments, to unload carts from automated drive units, the automated drive units transporting carts may move into cart stations. For example, if no objects are determined to be partially or completely inside of the cart station 116, the automated drive unit 102 may move through the restricted area 112 and into the cart station 116. The automated drive unit 102 may unload the cart 104 by lowering the cart 104 inside of the cart station 116 and exit the cart station 116. If no objects are determined to be partially or completely inside of the cart station 116, the operator of the cart station 116 move through the access point 118 and move the cart 104 (e.g., manually pull/push the cart 104, or electronically/remotely control the cart 104 to move) out of the cart station 116 and into the unrestricted area 114. For example, the automated drive unit 102 that unloads the cart 104 may move in the direction of the arrows shown in FIG. 1.

Figure 2:
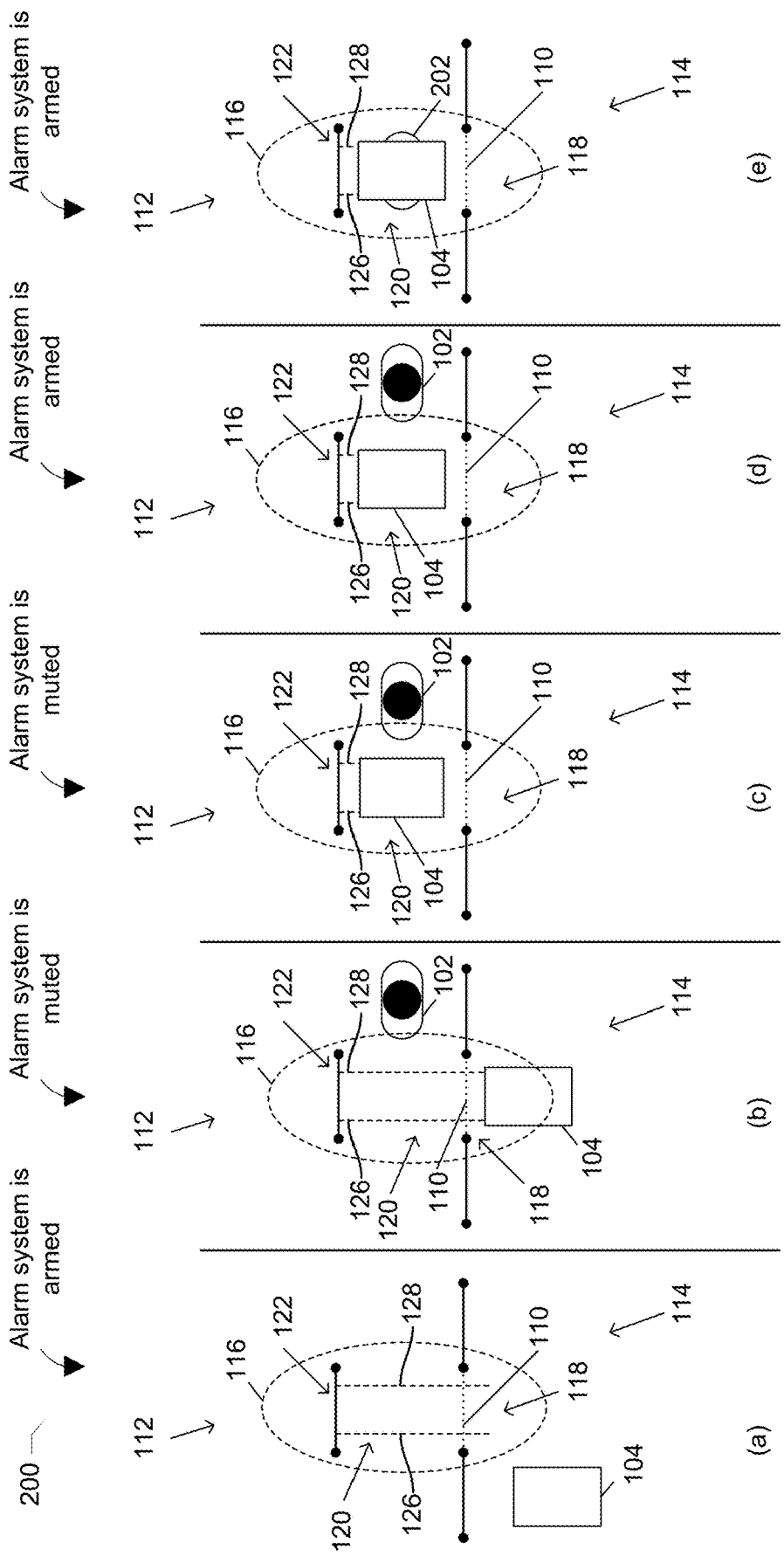
FIG. 2 illustrates an example workspace for loading a cart onto an automated drive unit, according to an embodiment of the present disclosure.

FIG. 2 illustrates an example workspace 200 for loading a cart 104 onto an automated drive unit 102, according to an embodiment of the present disclosure. The cart 104 may be moved between the restricted area 112 and the unrestricted area 114. By way of example, each of (a)-(e) of FIG. 2 may include a view at a point in time of an arrangement of a number of components such as the cart station 116 used to load the onto the automated drive unit 102. For instance, (a) may correspond to a first time, (b) may correspond to a second time subsequent to the first time in (a), (c) may correspond to a third time subsequent to the second time in (b), (d) may correspond to a fourth time subsequent to the third time in (c), and (e) may correspond to a fifth time subsequent to the fourth time in (d). The cart station 116 may include the access point 118, the interaction area 120, and the back fence area 122. The cart station 116 may be controlled to move the automated drive unit 102 into, and out of, the interaction area 120 by using the logistic management system 950 of FIG. 9 and/or the computing device 946 of FIG. 9. The cart station 116 may include the first sensor 106 and the second sensor 108 that sense objects via the first sensor stream 126 and the second sensor stream 128, respectively. The first sensor 106 and the second sensor 108 may be positioned at, and/or attached to, the back fence area 122. The cart station 116 may include the computing device 124 to control the cart station 116, via a button in the cart station 116 (e.g., a button in the computing device 124). The access point 118 may include the light curtain 110.

In (a) of FIG. 2, the cart station 116 may be controlled to operate while the cart 104 is moved by an operator through the unrestricted area 114 and toward the access point 118.

The light curtain 110 may include one or more light emitters that produce light aimed at one or more light receivers. The light emitted by the one or more light emitters of the light curtain 110 may be received by the one or more light receivers. The one or more light receivers may generate light curtain data indicating that light emitted from one or more corresponding light emitters is received by one or more light receivers. The cart station 116 may be operated in the ready state, based at least in part on light curtain data received from the one or more light receivers.

The light curtain 110 may detect breaches by objects (e.g., a cart, an operator, an automated drive unit etc.). The one or more light receivers may generate light curtain data indicating that light from one or more corresponding light emitters is not received by one or more light receivers. For example, the one or more light receivers may not receive light based at least in part on the light being blocked by an object (e.g., the light curtain data may indicate a breach of the light curtain 110 based at least in part on the object traversing through the light curtain). The one or more light receivers may transmit, to the logistic management system 950, the light curtain data indicating that the light is not received.

The logistic management system 950, upon receiving the light curtain data indicating the breach of the light curtain 110 while the cart station 116 is operating in the ready state, may immediately transition the cart station 116 to the breach state. While the cart station 116 is operating in this breach state, the logistic management system 950 may trigger an alarm system associated with the light curtain 110. As stated herein, the alarm may be audible (e.g., a siren, beeping, etc.), visual (e.g., colored and/or flashing lights), and/or physical (e.g., vibrations). The cart station 116 may return to the ready state based at least in part on the object being removed from the light curtain 110 and/or input received from the operator, via the computing device 124. The alarm system associated with the light curtain 110 may be armed in the ready state and the breach state, based at least in part on the cart station 116 being maintained in the first mode. In the first mode, the alarm system associated with the light curtain 110 remains armed and may be triggered as a result of a breach of the light curtain 110.

The first sensor 106 and the second sensor 108 may detect movement of objects in the cart station 116 and in front of the access point 118. Initially, the first sensor 106 and the second sensor 108 may not detect movement of the cart 104 as the cart 104 moves toward the restricted area 112 and away from the unrestricted area 114. For example, movement of the cart 104 may not be detected based at least in part on the cart being askew from a detection area in front of the first sensor 106 and/or the second sensor 108 (e.g., the cart 104 being positioned at a side of the access point 118). The first sensor 106 and the second sensor 108 may generate sensor data (e.g., one or more signals), the one or more signals indicating no detection of any movement of the cart 104. The cart station 116 may be operated in the first mode associated with the light curtain 110, based at least in part on the one or more signals. As stated above, the first mode causes the alarm system associated with the light curtain 110 to remain armed.

Automated drive units near the cart station 116, including the automated drive unit 102, may be controlled to be motionless, based at least in part on the first mode associated with the light curtain 110 being maintained, if the cart station 116 is operated in the breach state. For example, automated drive units within a threshold distance of the cart station 116 may be controlled to be motionless. Automated drive units near the cart station 116, including the automated drive unit 102, may operate normally, based at least in part on the first mode associated with the light curtain 110 being maintained, if the cart station 116 is operated in the ready state.

In (b) of FIG. 2, the cart station 116 may be controlled to operate in a ready state or a breach state while the cart 104 is moved by the operator toward, and/or through, the access point 118 (e.g., while the cart 104 is manually pushed/pulled, or electronically/remotely controlled to move) toward the interaction area 120). For example, the cart may be initially positioned in front of the access point 118. The cart 104 may be moved by the operator toward the access point 118 and the interaction area 118. For example, the cart 104 may be moved in a direction perpendicular to the back fence area 122.

The light curtain 110 in the access point 118 may generate and transmit, to the logistic management system 950, light curtain data. The light curtain data generated by the light curtain 110 may indicate that light is received or not received by the one or more light receivers of the light curtain 110. The cart station 116 may be controlled to operate in the ready state or the breach state based at least in part on the light curtain data indicating that light is received or not received by the one or more light receivers, respectively.

While the cart station 116 is maintained in the first mode associated with the light curtain 110, the cart station 116 may be controlled to operate in the ready state, based at least in part on the light curtain data indicating that light being emitted by the one or more light emitters of the light curtain 110 is not blocked by any object. The alarm system associated with the light curtain 110 may be untriggered. While the cart station 116 is maintained in the first mode associated with the light curtain 110, the cart station 116 may be controlled to operate in the breach state based at least in part on the light curtain data indicating that the light is blocked by an object. The alarm system associated with the light curtain 110 may be triggered.

The first sensor 106 and the second sensor 108 may detect movement of cart 104 as the cart 104 moves toward the restricted area 112 and away from the unrestricted area 114 based at least in part on the cart 104 being positioned in front of the first sensor 106 and/or the second sensor 108. For example, the first sensor 106 and the second sensor 108 may detect movement of cart 104 as the cart 104 moves toward the interaction area 118 in the direction perpendicular to the back fence area 122. Sensor data (e.g., at least one signal) may be generated by the first sensor 106 and the second sensor 108. By way of example, the cart station 116 may be operated to maintain the first mode associated with the light curtain 110, further based at least in part on the sensor data indicating that a distance from at least one of the first sensor 106 or the second sensor 108 to the cart 104 is greater than a threshold distance (e.g., a threshold distance corresponding to the cart 104 being completely outside of the interaction area 120).

As the cart is moved into the interaction area 120 and toward the back fence area 122 (e.g., the cart is manually pushed/pulled, or electronically/remotely controlled to move), the distance between the cart 104 and the back fence area 122 decreases. The cart station 116 may be controlled to change the first mode associated with the light curtain 110 to the second mode, based at least in part on the sensor data indicating that a distance from at least one of the first sensor 106 or the second sensor 108 to the cart 104 is less than, or equal to, a threshold distance (e.g., a threshold distance corresponding to the cart 104 being completely outside of the interaction area 120). For example, an identity of the cart 104 may be determined based at least in part on the distance between the first sensor 106 and the cart 104 being substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range).

The alarm system associated with the light curtain 110 may be changed from armed to muted, based at least in part on the first mode associated with the light curtain 110 being changed to the second mode. For example, the alarm system is muted as the cart 104 is moved by the operator through the access point 118, based at least in part on the light curtain 110 being maintained in the second mode. The alarm system associated with the light curtain 110 for the cart station 116 that is in the breach state remains muted regardless of the one or more light receivers not receiving the light that is blocked the cart 104.

Automated drive units near the cart station 116, including the automated drive unit 102, may be controlled to be motionless, based at least in part on the first mode associated with the light curtain 110 being changed to the second mode. Automated drive units near the cart station 116, including the automated drive unit 102, may be controlled to be motionless, based at least in part on the first mode associated with the light curtain 110 being changed to the second mode, regardless of the cart station 116 being operated in the ready state or the breach state.

In (c) of FIG. 2, the cart station 116 may be controlled to operate while the cart 104 is moved by the operator through the access point 118 and into the interaction area 120. The first sensor 106 and the second sensor 108 may detect movement of cart 104 as the cart 104 moves toward the interaction area 118 in the direction perpendicular to the back fence area 122. The first sensor 106 and the second sensor 108 may generate sensor data (e.g., one or more signals), the one or more signals indicating movement of the cart 104 toward the interaction area 118.

The one or more signals may be transmitted to the logistic management system 950 and used by the logistic management system 950 to determine the identity of the cart 104. The one or more signals may include a signal generated by the first sensor 106 and a signal generated by the second sensor 108. The signals generated by the first sensor 106 and the second sensor 108 may indicate a distance from the cart 104 and to the first sensor 106 and/or the second sensor 108. By way of example, the identity of the cart is determined based on determining that the first sensor 106 and the second sensor 108 detect a flat surface of the cart 104 (e.g., the distances from both of the first sensor 106 and the second sensor 108 to the cart are the same). The logistic management system 950 may determine the difference between a cart and a person based on detecting the flat surface of the cart versus a non-flat surface of a person (e.g., chest, waist, legs/arms, etc.). For example, the identity of the cart 104 may be determined based at least in part on the distance between the first sensor 106 and the cart 104 being substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range).

The second mode associated with the light curtain 110 may be maintained, based at least in part on the identity of the cart 104. The second mode associated with the light curtain 110 may cause the alarm system to be muted. By way of example, the second mode may be maintained, further based at least in part on the one or more signals. The one or more signals may indicate that a distance from at least one of the first sensor 106 or the second sensor 108 to the cart 104 is less than the threshold distance corresponding to the cart 104 being completely outside the interaction area 120. The one or more signals may indicate that the distance from at least one of the first sensor 106 or the second sensor 108 to the cart 104 is greater than the threshold distance corresponding to the cart 104 being completely inside the interaction area 120. By way of example, the threshold distance corresponding to the cart 104 being completely inside the interaction area 120 may be less than the threshold distance corresponding to the cart 104 being completely outside of the interaction area 120.

While the cart station 116 is maintained in the second mode associated with the light curtain 110, the alarm system remains muted as the cart 104 is moved (e.g., manually pushed/pulled, or electronically/remotely controlled to move) through the access point 118. For example, the alarm system associated with the light curtain 110 in the breach state remains muted regardless of the one or more light receivers not receiving the light that is blocked the cart 104, based at least in part on the cart station 116 being maintained in the second mode associated with the light curtain 110. Otherwise, the alarm system would be triggered each time a cart 104 is moved through the light curtain 110 into the cart station 116 from the unrestricted area 114, as well as when the cart 104 is moved (e.g., manually pulled/pushed, or electronically/remotely controlled to move) through the light curtain 110 from the cart station 116 into the unrestricted area 114.

Automated drive units near the cart station 116, including the automated drive unit 102, may be controlled to be motionless, based at least in part on the cart station 116 being operated to maintain the second mode associated with the light curtain 110. Automated drive units near the cart station 116, including the automated drive unit 102, may be controlled to be motionless, based at least in part on the cart station 116 being operated to maintain the second mode associated with the light curtain 110, regardless of the cart station 116 being operated in the ready state or the breach state. For example, automated drive units within a threshold distance of the cart station 116 may be controlled to be motionless.

In (d) of FIG. 2, the cart station 116 may be controlled to operate while the cart 104 is being moved out of the access point 118 and into the interaction area 120. The light curtain 110 may include one or more light emitters that produce light aimed at one or more light receivers. The cart 104 is determined to be positioned outside of the access point 118, based at least in part on the light curtain data. For example, the light curtain data may indicate that light emitted from the one or more corresponding light emitters is received by the one or more light receivers after the cart 104 is moved out of the access point 118.

The second mode associated with the light curtain 110 may be changed to the first mode, based at least in part on determining that the cart 104 is outside of the access point 118. For example, one or more signals may be generated by the first sensor 106 and/or the second sensor 108. The one or more signals may include a signal generated by the first sensor 106 and a signal generated by the second sensor 108. The signals generated by the first sensor 106 and the second sensor 108 may indicate a distance from the cart 104 and to the first sensor 106 and/or the second sensor 108. The one or more signals may indicate that the distance from at least one of the first sensor 106 or the second sensor 108 to the cart 104 has decreased to be less than a threshold distance (e.g., a threshold distance corresponding to the cart 104 being completely inside the interaction area 120). The second mode associated with the light curtain 110 may be changed to the first mode, further based at least in part on determining that the distance indicated by the signal generated by the first sensor 106 is substantially equivalent to the distance indicated by the signal generated by the second sensor 108 (e.g., a difference between the distance from the cart 104 to the first sensor 106, and the distance from the cart 104 to the second sensor 108, is determined to be less than a predetermined tolerance range). That is, the second mode, in which the alarm system is muted, may be changed to the first mode, in which the alarm system is armed, since the cart has been moved completely into the cart station 116 and the operator is within the unrestricted area 114.

The second mode associated with the light curtain 110 may be changed to the first mode, further based at least in part on receiving input from a button pressed by the operator (e.g., a button in the computing device 124 being pressed after the operator returns to the unrestricted area 114). For instance, after the cart 104 has been moved completely into or completely out of the cart station 116, and the operator is within the unrestricted area 114, the operator may input a control signal (e.g., push or otherwise actuate a button, actuate a user interface element via a display, scan a card or code, etc.). This input by the operator may indicate that the operator is safely within the unrestricted area 114, and a corresponding signal may cause the second mode (alarm system muted) to be changed back to the first mode (alarm system armed). While the cart station 116 is controlled to maintain the first mode associated with the light curtain 110, the alarm system is armed.

By way of example, the second mode associated with the light curtain 110 may be changed to the first mode after the distance from at least one of the first sensor 106 or the second sensor 108 to the cart 104 is indicated as being less than a threshold distance (e.g., a threshold distance corresponding to the cart 104 being completely inside the interaction area 120), regardless of the input being received from the button pressed by the operator. By way of another example, the second mode may be prevented from being changed to the first mode after the distance from at least one of the first sensor 106 or the second sensor 108 to the cart 104 is indicated as being less than the threshold distance (e.g., the threshold distance corresponding to the cart 104 being completely inside the interaction area 120), until the input is received from the button pressed by the operator.

Automated drive units near the cart station 116, including the automated drive unit 102, may be controlled to be motionless (or the motion may be less than a threshold velocity/rate), based at least in part on the second mode associated with the light curtain 110 being changed to the first mode, if the cart station 116 is determined to be in the breach state. Automated drive units near the cart station 116, including the automated drive unit 102, may be operated normally, based at least in part on the second mode associated with the light curtain 110 being changed to the first mode, if the cart station 116 is determined to be in the ready state.

In (e) of FIG. 2, the cart station 116 may be controlled to operate while the cart 104 is being removed from the interaction area 120 by the automated drive unit 102. The light curtain 110 may include one or more light emitters that produce light aimed at one or more light receivers. The light emitted by the one or more light emitters of the light curtain 110 may be received by the one or more light receivers. The light curtain data may indicate that light emitted from one or more corresponding light emitters is received by one or more light receivers. The light curtain data may indicate that light being emitted by the one or more light emitters of the light curtain 110 is not blocked or is blocked.

The cart station 116 may be controlled to operate in the ready state based at least in part on light curtain data indicating that the light is not blocked by an object. The cart station 116 may be controlled to operate in the breach state based at least in part on light curtain data indicating that the light is blocked by an object.

The first mode associated with the light curtain 110 may be maintained, based at least in part on sensor data indicating that the cart 104 is completely in the interaction area 120, and further based at least in part on sensor data indicating that no other cart is positioned in front of the first sensor 106 and the second sensor 108. While the light curtain 110 is maintained in the first mode, the alarm system associated with the light curtain 110 is armed.

Automated drive units in the workspace 200, including the automated drive unit 102, may be controlled to be motionless, based at least in part on the first mode associated with the light curtain 110 being maintained, if the cart station 116 is operated in the breach state. Automated drive units in the workspace 200, including the automated drive unit 102, may be operated normally, based at least in part on the first mode associated with the light curtain 110 being maintained, if the cart station 116 is operated in the ready state.

Figure 3:
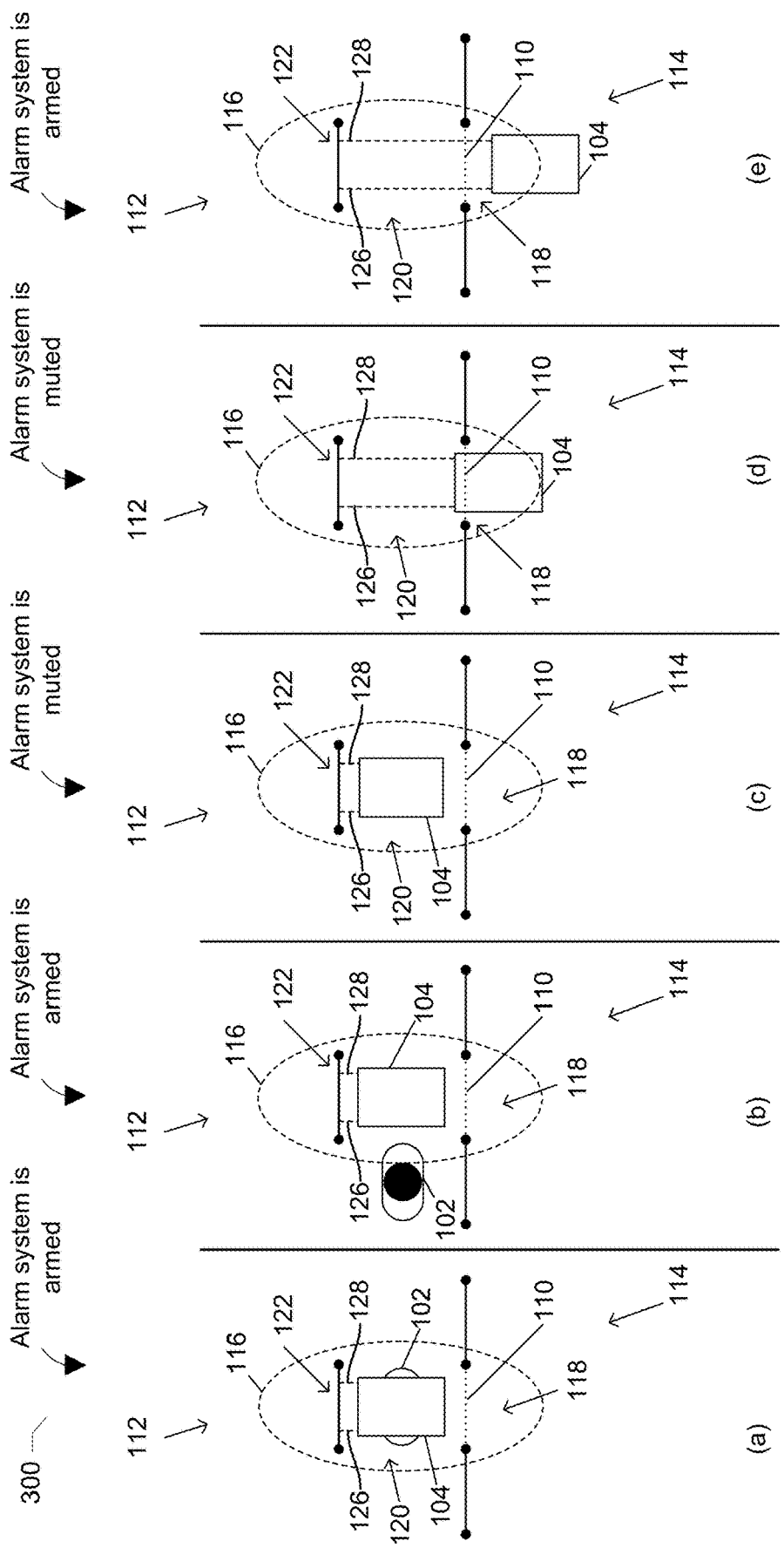
FIG. 3 illustrates an example workspace for unloading a cart from an automated drive unit, according to an embodiment of the present disclosure.

FIG. 3 illustrates an example workspace 300 for unloading a cart 104 from an automated drive unit 102, according to an embodiment of the present disclosure. The cart 104 may be moved between the restricted area 112 and the unrestricted area 114. By way of example, each of (a)-(e) of FIG. 3 may include a view at a point in time of an arrangement of a number of components such as the cart station 116 used to unload the cart 104 from the automated drive unit 102. The cart station 116 may include the access point 118, the interaction area 120, and the back fence area 122. The cart station 116 may be controlled to move the automated drive unit 102 into, and out of, the interaction area 120 based at least in part on the logistic management system 950 of FIG. 9, and/or the computing device 946 of FIG. 9. The cart station 116 may include the first sensor 106 and the second sensor 108 that sense objects via the first sensor stream 126 and the second sensor stream 128, respectively. The first sensor 106 and the second sensor 108 may be positioned at, and/or attached to, the back fence area 122. The cart station 116 may include the computing device 124 to control the cart station 116, via a button in the cart station 116 (e.g., a button in the computing device 124). The access point 118 may include the light curtain 110.

In (a) of FIG. 3, the cart station 116 may be controlled to operate in a ready state or a breach state while the cart 104 is moved into the interaction area 120 by the automated drive unit 102. The light curtain 110 may include one or more light emitters that produce light aimed at one or more light receivers. The light emitted by the one or more light emitters of the light curtain 110 may be received by the one or more light receivers. The light curtain data may indicate that light emitted from one or more corresponding light emitters is received by one or more light receivers. The cart station 116 may be operated in the ready state, based at least in part on light curtain data generated by one or more light receivers.

The first sensor 106 and the second sensor 108 may detect the cart 104 based at least in part on the cart 104 being moved into the interaction area 120. For example, the cart 104 may be moved by the automated drive unit 102 to an area in front of the first sensor 106 and/or the second sensor 108. The cart 104 may remain stationary (e.g., immobile) after being moved into the interaction area 120 by the automated drive unit 102. The cart station 116 may be operated in a first mode associated with the light curtain 110, based at least in part on no movement of the cart 104 being detected by the first sensor 106 and/or the second sensor 108. The first mode associated with the light curtain 110 may be maintained. The first mode being maintained may cause an alarm system associated with the light curtain 110 to remain armed.

The light curtain 110 may detect breaches by objects. The light curtain 110 may generate light curtain data indicating that light from one or more corresponding light emitters is not received by one or more light receivers. For example, the one or more light receivers may not receive light based at least in part on the light being blocked by an object. The one or more light receivers may transmit, to the logistic management system 950, the light curtain data indicating that the light is not received. The light curtain data may indicate a breach of the light curtain 110 based at least in part on the object traversing through the light curtain.

The logistic management system 950, upon receiving the light curtain data indicating the breach of the light curtain 110 while the cart station 116 is operating in the ready state, may immediately transition the cart station 116 to the breach state. While the cart station 116 is operating in this breach state, the logistic management system 950 may trigger an alarm system associated with the light curtain 110.

The cart station 116 may return to the ready state based at least in part on the object being removed from the light curtain 110 and/or input received from an operator, via the computing device 124. The alarm system associated with the light curtain 110 may be armed in the ready state and the breach state, based at least in part on the cart station 116 being maintained in the first mode.

Automated drive units in the workspace 300, including the automated drive unit 102, may be controlled to be motionless, based at least in part on the first mode associated with the light curtain 110 being maintained, if the cart station 116 is operated in the breach state. Automated drive units in the workspace 300, including the automated drive unit 102, may be operated normally, based at least in part on the first mode associated with the light curtain 110 being maintained, if the cart station 116 is operated in the ready state.

In (b) of FIG. 3, the cart station 116 may be operated in the ready state or the breach state while the cart 104 remains stationary (e.g., immobile) in the interaction area 120, and while the automated drive unit 102 exits the interaction area 120. The light curtain 110 may include one or more light emitters that produce light aimed at one or more light receivers. The light emitted by the one or more light emitters of the light curtain 110 may be received by the one or more light receivers. The light curtain data may indicate that light being emitted by the one or more light emitters of the light curtain 110 is not blocked or is blocked.

The cart station 116 may be controlled to operate in the ready state based at least in part on the light curtain data indicating that the light is not blocked by an object. The cart station 116 may be controlled to operate in the breach state based at least in part on light curtain data indicating that the light is blocked by an object.

The cart station 116 may be operated in a first mode associated with the light curtain 110, based at least in part on no movement of the cart 104 being detected by the first sensor 106 and/or the second sensor 108. The first mode associated with the light curtain 110 may be maintained, based at least in part on sensor data indicating that the cart 104 is completely in the interaction area 120. While the cart station 116 is operated in the first mode associated with the light curtain 110, an alarm system associated with the light curtain 110 is maintained to be armed.

Automated drive units near the cart station 116, including the automated drive unit 102, may be controlled to be motionless, based at least in part on the first mode associated with the light curtain 110 being maintained, if the cart station 116 is operated in the breach state. Automated drive units near the cart station 116, including the automated drive unit 102, may be operated normally, based at least in part on the first mode associated with the light curtain 110 being maintained, if the cart station 116 is operated in the ready state.

In (c) of FIG. 3, the cart station 116 may be controlled to operate while the cart 104 remains stationary (e.g., immobile) in the interaction area 120. The light curtain 110 may include one or more light emitters that produce light aimed at one or more light receivers. The light emitted by the one or more light emitters of the light curtain 110 may be received by the one or more light receivers. The light curtain data may indicate that light being emitted by the one or more light emitters of the light curtain 110 is not blocked or is blocked. The cart 104 is determined to be positioned outside of the access point 118, based at least in part on the light curtain data indicating that the light is received by the one or more light receivers.

The cart station 116 may be controlled to operate in the ready state based at least in part on light curtain data indicating that the light is not blocked by an object. The cart station 116 may be controlled to operate in the breach state based at least in part on light curtain data indicating that the light is blocked by an object.

The first mode may be changed to the second mode, based at least in part on determining that a distance between the automated drive unit 102 and the cart station 116 (e.g., a nearest portion of a perimeter of the cart station 116 to the automated drive unit 102) is greater than, or equal to, a threshold distance. The first mode may be changed to the second mode, further based at least in part on receiving input from a button pressed by the operator (e.g., a button in the computing device 124 being pressed by the operator). The alarm system associated with the light curtain 110 is changed from armed to muted, based at least in part on the first mode associated with the light curtain 110 being changed to the second mode.

Sensor data (e.g., one or more signals) may be generated by the first sensor 106 and the second sensor 108, the one or more signals indicating no movement of the cart 104. The second mode associated with the light curtain 110 may be maintained, based at least in part on the sensor data indicating that the cart 104 is completely inside of the interaction area 120. For example, the one or more signals may indicate that the distance from at least one of the first sensor 106 or the second sensor 108 to the cart 104 is less than, or equal to, a threshold distance (e.g., a threshold distance corresponding to the cart 104 being completely inside the interaction area 120). The one or more signals may include a signal generated by the first sensor 106 and a signal generated by the second sensor 108. The signal generated by the first sensor 106 may indicate a distance between the first sensor 106 and the cart 104. The signal generated by the second sensor 108 may indicate a distance between the second sensor 108 and the cart 104. The second mode associated with the light curtain 110 may be maintained, further based at least in part on determining that the distance indicated by the signal generated by the first sensor 106 is substantially equivalent to the distance indicated by the signal generated by the second sensor 108 (e.g., a difference between the distance from the cart 104 to the first sensor 106, and the distance from the cart 104 to the second sensor 108, is determined to be less than a predetermined tolerance range).

Automated drive units near the cart station 116, including the automated drive unit 102, may be controlled to be motionless, based at least in part on the first mode associated with the light curtain 110 being changed to the second mode. For example, automated drive units near the cart station 116, including the automated drive unit 102, may be controlled to be motionless regardless of the cart station 116 being operated in the ready state or the breach state. For example, automated drive units within a threshold distance of the cart station 116 may be controlled to be motionless.

In (d) of FIG. 3, the cart station 116 may be controlled to operate in a ready state or a breach state while the cart 104 is moved by the operator toward, and/or through, the access point 118 (e.g., while the cart 104 is manually pulled/pushed, or electronically/remoted controlled to move, out of the interaction area 120). For example, the cart may be initially positioned inside of the interaction area 118. The cart 104 may be moved toward the access point 118 and out of the interaction area 118. For example, the cart 104 may be moved in a direction perpendicular to the back fence area 122.

The light curtain 110 in the access point 118 may generate and transmit, to the logistic management system 950, light curtain data. The light curtain data generated by the light curtain 110 may indicate that light is received or not received by the one or more light receivers of the light curtain 110. The cart station 116 may be controlled to operate in the ready state or the breach state based at least in part on the light curtain data indicating that light is received or not received by the one or more light receivers, respectively.

The second mode associated with the light curtain 110 may be maintained. The first sensor 106 and the second sensor 108 may detect movement of cart 104 as the cart 104 moves out of the interaction area 118 in the direction perpendicular to the back fence area 122. The first sensor 106 and the second sensor 108 may generate sensor data (e.g., one or more signals), the one or more signals indicating movement of the cart 104 toward the access point 118. The one or more first signals may include a signal generated by the first sensor 106 and a signal generated by the second sensor 108. The signals generated by the first sensor 106 and the second sensor 108 may indicate a distance from the cart 104 and to the first sensor 106 and/or the second sensor 108. By way of example, the second mode associated with the light curtain 110 is maintained further based at least in part on the sensor data indicating that a distance from at least one of the first sensor 106 or the second sensor 108 to the cart 104 is increased to be greater than, or equal to, a threshold distance (e.g., a threshold distance corresponding to the cart 104 being completely inside the interaction area 120).

An identity of the cart 104 may be determined based at least in part on determining that the distance between the first sensor 106 and the cart 104 is substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range).

As the cart is moved (e.g., manually pulled/pushed, or electronically/remotely controlled to move) out of the interaction area 120 and away from the back fence area 122, the distance between the cart 104 and the back fence area 122 increases. the second mode associated with the light curtain 110 is maintained, based at least in part on the sensor data indicating that a distance from at least one of the first sensor 106 or the second sensor 108 to the cart 104 is less than a threshold distance (e.g., a threshold distance corresponding to the cart 104 being completely outside of the interaction area 120).

While the second mode associated with the light curtain 110 is maintained, the alarm system remains muted as the cart 104 is moved (e.g., manually pulled/pushed, or electronically/remotely controlled to move) through the access point 118. For example, the alarm system associated with the light curtain 110 of the cart station 116 in the ready state or the breach state remains muted regardless of the one or more light receivers not receiving the light that is blocked the cart 104, based at least in part on the second mode associated with the light curtain 110 being maintained.

Automated drive units near the cart station 116, including the automated drive unit 102, may be controlled to be motionless, based at least in part on the second mode associated with the light curtain 110 being maintained, regardless of the cart station 116 being operated in the ready state or the breach state. For example, automated drive units within a threshold distance of the cart station 116 may be controlled to be motionless.

In (e) of FIG. 3, the cart station 116 may be controlled to operate while the cart 104 is moved by the operator through the unrestricted area 114 and away from the access point 118. The light emitted by the one or more light emitters of the light curtain 110 may be received by the one or more light receivers. The one or more light receivers may generate light curtain data indicating that light emitted from one or more corresponding light emitters is received by one or more light receivers. The cart station 116 may be operated in the ready state, based at least in part on light curtain data received from the one or more light receivers.

The light curtain 110 may detect breaches by objects (e.g., a cart, an operator, an automated drive unit etc.). The one or more light receivers may generate light curtain data indicating that light from one or more corresponding light emitters is not received by one or more light receivers. For example, the one or more light receivers may not receive light based at least in part on the light being blocked by an object. The one or more light receivers may transmit, to the logistic management system 950, the light curtain data indicating that the light is not received.

The first sensor 106 and the second sensor 108 may detect movement of objects in the cart station 116 and in front of the access point 118. The cart 104 (e.g., movement of the cart 104) may be detected while the cart is moved away from the access point 118 in a direction perpendicular to the back fence area 122. For example, the first sensor 106 and the second sensor 108 may generate sensor data (e.g., one or more signals), the one or more signals indicating movement of the cart 104 away from the access point 118. The second mode associated with the light curtain 110 may be changed to the first mode, based at least in part on the sensor data indicating that a distance from at least one of the first sensor 106 or the second sensor 108 to the cart 104 is greater than a threshold distance (e.g., a threshold distance corresponding to the cart 104 being completely outside of the interaction area 120).

An identity of the cart 104 may be determined based at least in part on determining that the distance between the first sensor 106 and the cart 104 is substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range).

The first mode associated with the light curtain 110 may be maintained based at least in part on objects other than the cart 104 being detected by one of the first sensor 106 or the second sensor 108. By way of example, the cart station 116 may be controlled to maintain the first mode associated with the light curtain 110 based at least in part on a distance to an object determined by the first sensor 106 being different from a distance to the object determined by the second sensor 108 (e.g., a difference between a distance to an object determined by the first sensor 106 and a distance to the object determined by the second sensor 108 being greater than a predetermined tolerance range). By way of another example, the cart station 116 may be controlled to maintain the first mode associated with the light curtain 110 based at least in part on an object being determined to be in front of only one of the first sensor 106 or the second sensor 108.

The cart 104 (e.g., movement of the cart 104) may be detected to be not in front of the access point 118, while the cart is askew from a detection area in front of the first sensor 106 and/or the second sensor 108 (e.g., the cart 104 being stationary and/or being moved at an area adjacent to the access point 118). The cart station 116 may be controlled to maintain the first mode associated with the light curtain 110. The first sensor 106 and the second sensor 108 may generate sensor data (e.g., one or more signals), the one or more signals indicating no detection of any movement of the cart 104. The first mode causes the alarm system associated with the light curtain 110 to remain armed.

Figure 4:
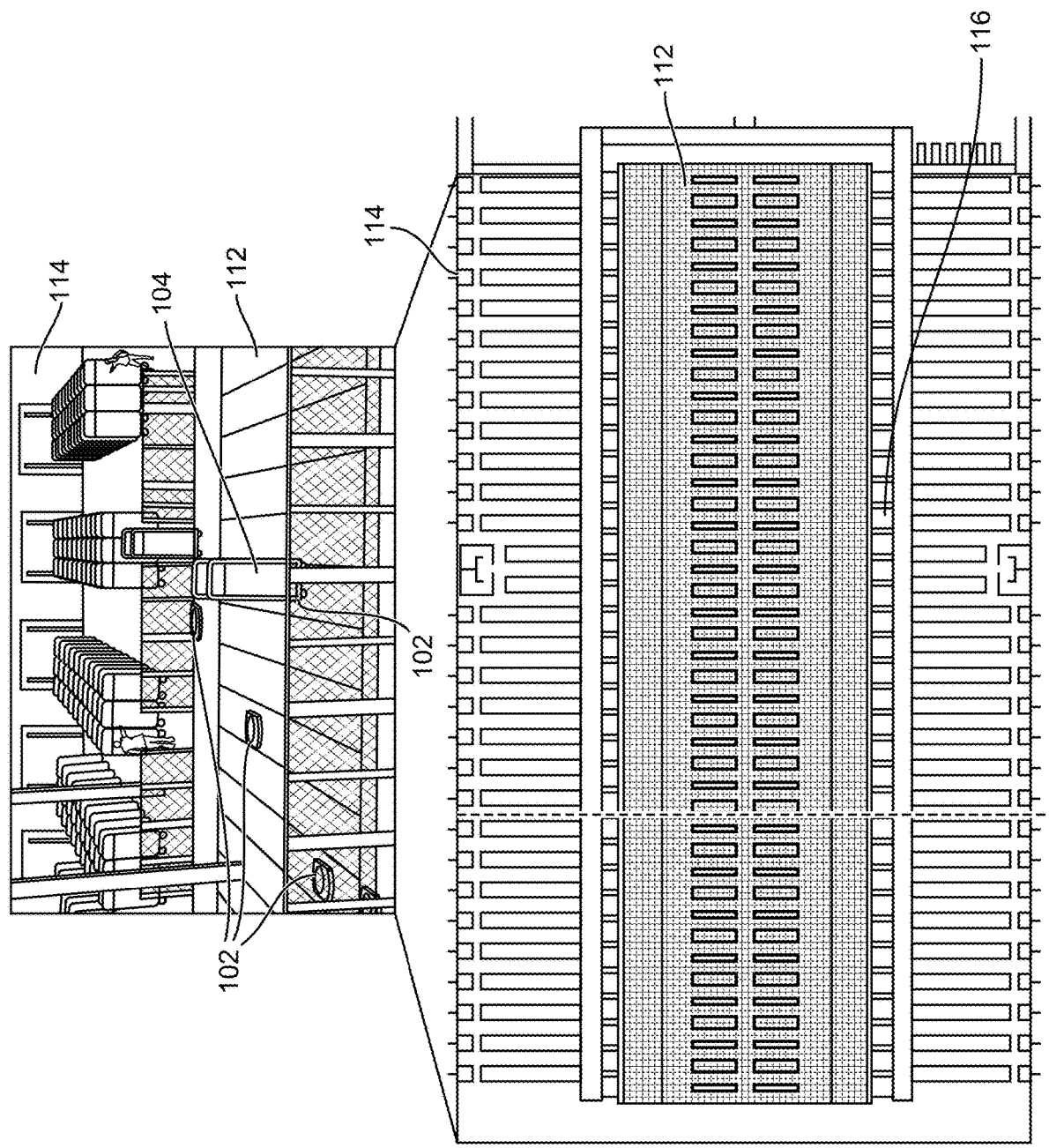
FIG. 4 is a schematic diagram illustrating an example environment suitable for implementing aspects of a workspace for moving carts between a restricted area and an unrestricted area, according to an embodiment of the present disclosure.

FIG. 4 is a schematic diagram illustrating an example environment 400 suitable for implementing aspects of a workspace 100 for moving carts between a restricted area 112 and an unrestricted area 114, according to an embodiment of the present disclosure. In at least one embodiment, the environment 400 may include any suitable number of components such as the cart 104, and a plurality of automated drive units 102. In some embodiments, the restricted area 112 may be separated from the unrestricted area 114 by a plurality of cart stations 116. The environment 400 may include carts 104 that are being transferred between the restricted area 112 and the unrestricted area 114, via the cart stations 116 and the automated drive units 102.

In some embodiments, the restricted area 112 may be used for transporting one or more automated drive units 102 to and from cart stations (e.g., cart station 116). The automated drive units may enter the cart stations to load or unload carts (e.g., cart 104). By way of example, an automated drive unit 102 may be automatically operated to move through the restricted area 116, enter the cart station 116, load a cart (e.g., the cart 104) that is moved (e.g., manually pushed/pulled, or electronically/remotely controlled to move) into the cart station 116 by the operator, and transport the cart 104 to another part of the restricted area 112. By way of another example, the automated drive unit 102 may be automatically operated to move through the restricted area 116, enter the cart station 116, unload a cart (e.g., the cart 104) into the cart station 116 by the operator, and exit the cart station 116. Because the restricted area 112 may be used for movement of a large number of heavy components (e.g., automated drive units transporting or not transports carts), access to the restricted area 112 is controlled to prevent personal/bodily injury and/or interruption of operation of the workspace 100. The restricted area 112 may be located between portions of the unrestricted area 114 to increase efficiency of the system loading carts from, or unloading carts into, the cart stations.

FIG. 5 illustrates an example cart 104 in a two-dimensional view, according to an embodiment of the present disclosure. As a non-limiting example, the cart 104 may include, at a side of the cart 104, solid surfaces (e.g., a first solid surface 500 and/or a second solid surface 502). The solid surfaces are used by the sensors (e.g., the first sensor 108 and the second sensor 110) of the cart stations to detect carts and/or movement of the carts. By way of example, the solid surfaces of the carts may be specifically oriented/positioned so that the sensors of the cart stations may detect carts moving towards, or away from, the cart stations. For example, the solid surfaces on the cart are aligned at a height that corresponds to the sensors, and vice versa. The solid surfaces may be at different heights and positioned at a particular distance from one another so that both sensors can sense the different solid surfaces at the same time.

By way of example, the first solid surface 500 may have a width that is less than a width of the second solid surface 502. The first solid surface 500 may have a height that is greater than a height of the second solid surface 502. In some embodiments, the first solid surface 500 may be located in, but is not limited to being located in, a center of a side of the cart 104. By way of example, the first solid surface 500 may be located adjacent to, at the left or right, of the center of the side of the cart 104.

Figure 6:
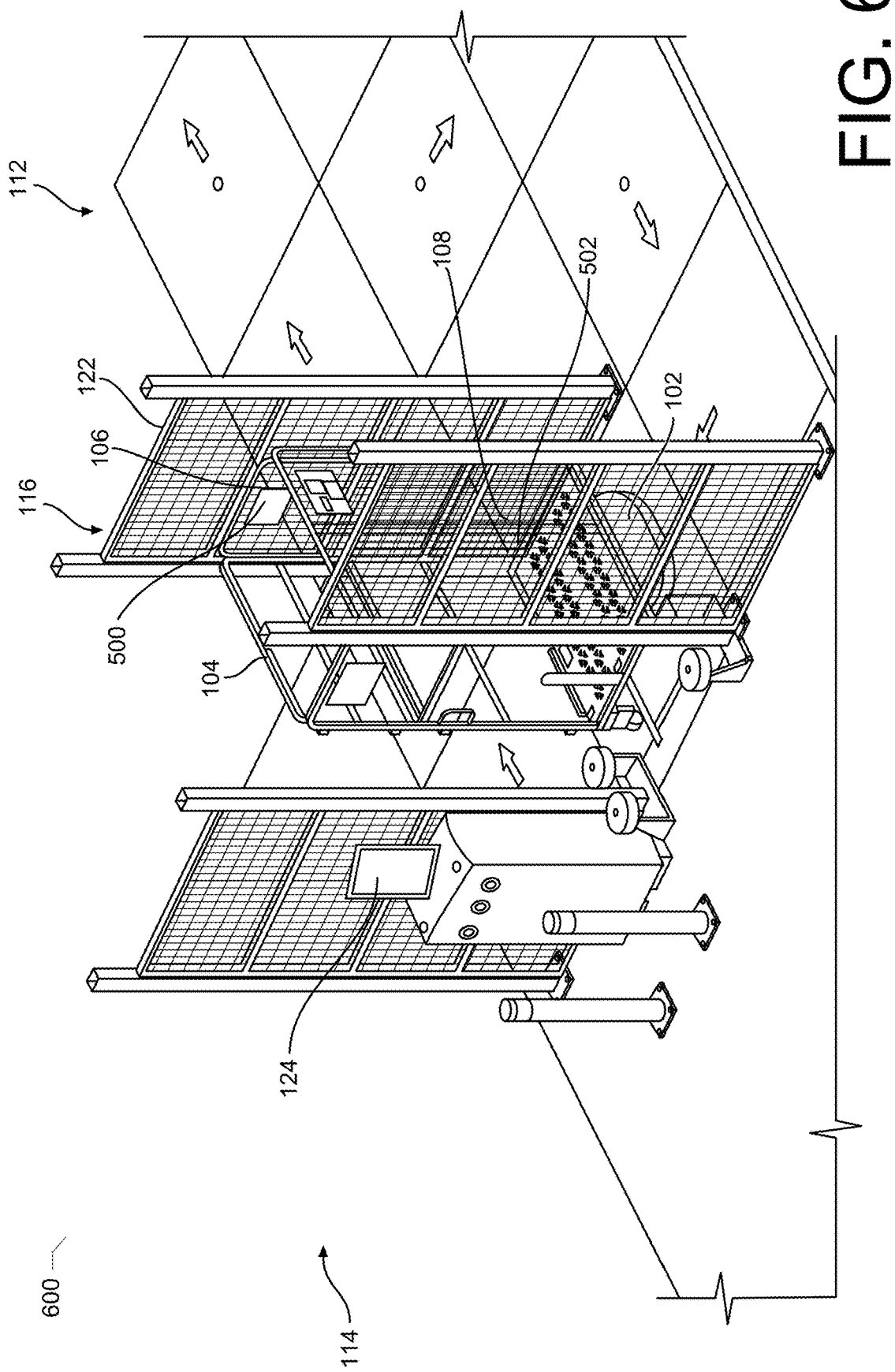
FIG. 6 illustrates an example cart in a cart station in a three-dimensional view, according to an embodiment of the present disclosure.

FIG. 6 illustrates an example cart 104 in a cart station 116 in a three-dimensional view, according to an embodiment of the present disclosure. The cart station 116 may be implemented somewhere in a workspace (e.g., workspace 400 of FIG. 4). The cart 104 may include a first solid surface 500 (e.g., first solid surface 500 of FIG. 5) and a second solid surface 502 (e.g., second solid surface 502 of FIG. 5). By way of example, the first solid surface 500 may be located adjacent to, at the left or right, of the center of the side of the cart 104. For example, a vertical alignment of a portion of the first solid surface 500 of a side of the cart station may be substantially equivalent to a vertical alignment of a first sensor (e.g., first sensor 106 of FIG. 1) of the cart station, and a vertical alignment of a portion of the second solid surface 502 of the side of the cart station may be substantially equivalent to a vertical alignment of a second sensor (e.g., a second sensor 108 of FIG. 1) of the cart station. By way of example, a horizontal alignment of a portion of the first solid surface 500 of a side of the cart station may be substantially equivalent to a horizontal alignment of the first sensor 106, and a horizontal alignment of a portion of the second solid surface 502 of the side of the cart station may be substantially equivalent to a horizontal alignment of the second sensor 108. In an example, the cart station 116 may include an automated drive unit 102, a computing device 124, and a back fence area 122.

Figure 7:
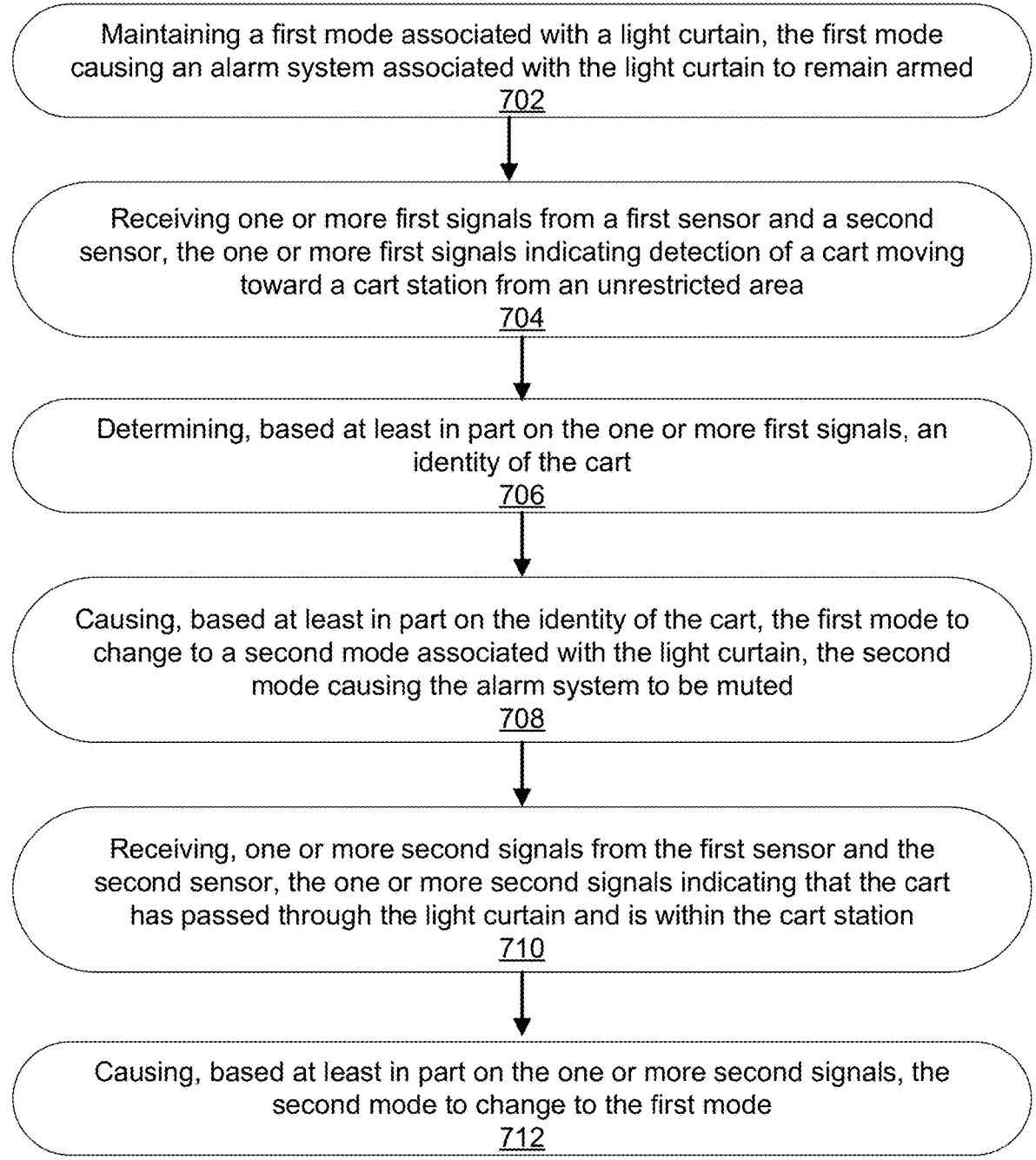
FIG. 7 illustrates an example process for instructing automated drive units to sort carts, according to an embodiment of the present disclosure.

FIG. 7 illustrates an example process 700 for instructing automated drive units to sort carts, according to an embodiment of the present disclosure. Some or all of the steps of the process 700 may be performed by various components in a system, the components including one or more of the logistic management system 950, the computing device 946, or user devices operated by personnel within the workspace 900 of FIG. 9. The system may include a cart station (e.g., cart station 116 of FIG. 1), within a restricted area (e.g., restricted area 112 of FIG. 1), in which carts that transport items are moved between the restricted area 112 and an unrestricted area (e.g., unrestricted area 114 of FIG. 1), the restricted area 112 including a plurality of automated drive units that move the carts between different locations. The system may include a light curtain (e.g., light curtain 110 of FIG. 1) that is adjacent to the cart station 116 and that separates the restricted area 112 from the unrestricted area 114, the carts entering and exiting the restricted area 112 through the light curtain 110. The system may include a first sensor (e.g., first sensor 106 of FIG. 1) and a second sensor (e.g., a second sensor 108 of FIG. 1) spaced apart from the first sensor 106 within the cart station 116, the first sensor 106 and the second sensor 108 detecting movement of the carts as the carts approach, and move away from, the cart station 116.

At block 702, the process includes maintaining a first mode associated with a light curtain 110, the first mode causing an alarm system associated with the light curtain 110 to remain armed. The first mode associated with the light curtain 110 initially may be maintained by a cart station 116 being used to load a cart 104 onto an automated drive unit 102, before the cart 104 is moved out of the unrestricted area 114 and into the cart station 116. Data received by the light curtain 110 and/or sensors of the cart station 116 may be used to determine that no objects are partially or completely inside of the cart station 116.

At block 704, the process includes receiving one or more first signals from the first sensor 106 and the second sensor 108, the one or more first signals indicating detection of the cart 104 moving toward the cart station 116 from an unrestricted area 114. The one or more first signals may be used to determine that a distance from the first sensor 106 and the second sensor 108 to the cart 104 decreases and becomes less than, or equal to, a threshold distance (e.g., a threshold distance corresponding to the cart 104 being completely outside of an interaction area (e.g., interaction area 120 of FIG. 1)).

At block 706, the process includes determining, based at least in part on the one or more first signals, an identity of the cart 104. The identity of the cart 104 may be determined based at least in part on determining that a flat surface of the cart 104 is detected. The flat surface of the cart 104 may be detected by determining that the distance between the first sensor 106 and the cart 104 is substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range).

At block 708, the process includes causing, based at least in part on the identity of the cart 104, the first mode to change to a second mode associated with the light curtain 110, the second mode causing the alarm system to be muted. The alarm system associated with the light curtain 110 is muted as the cart 104 is moved (e.g., manually pushed/pulled, or electronically/remotely controlled to move) into the cart station 116.

At block 710, the process includes receiving, one or more second signals from the first sensor 106 and the second sensor 108, the one or more second signals indicating that the cart 104 has passed through the light curtain 110 and is within the cart station 116. After the cart 104 has passed through the light curtain 110 and is completely inside of the cart station 116, the one or more second signals may indicate that a distance from at least one of the first sensor 106 or the second sensor 108 to the cart 104 has decreased to be less than a threshold distance (e.g., a threshold distance corresponding to the cart 104 being completely inside the interaction area 120).

At block 712, the process includes causing, based at least in part on the one or more second signals, the second mode to change to the first mode. The alarm system may be changed from muted to armed. Should an object (e.g., a cart, an operator, an automated drive unit, an object of another type, etc.) traversing through the light curtain 110 be detected, the alarm system may be triggered.

FIG. 8 illustrates an example process 800 for instructing automated drive units to sort carts, according to an embodiment of the present disclosure. Some or all of the steps of the process 800 may be performed by various components in a system, the components including one or more of the logistic management system 950, the computing device 946, or user devices operated by personnel within the workspace 900 of FIG. 9.

At block 802, the process includes maintaining a first mode associated with a light curtain (e.g., light curtain 110 of FIG. 1) adjacent to a cart station (e.g., cart station 116 of FIG. 1), the cart station 116 being within a restricted area (e.g., restricted area 112 of FIG. 1) in which carts that transport items are moved between the restricted area 112 and an unrestricted area (e.g., unrestricted area 114 of FIG. 1), the carts entering and exiting the restricted area 112 through the light curtain 110, the restricted area 112 including a plurality of automated drive units that move the carts between different locations, the first mode causing an alarm system associated with the light curtain 110 to remain armed. The first mode associated with the light curtain 110 initially may be maintained by the cart station 116 being used to unload a cart (e.g., cart 104 of FIG. 1) from an automated drive unit 102. Data received by the light curtain 110 and/or sensors of the cart station 116 may be used to determine that no objects are partially or completely inside of the cart station 116 while the automated drive unit 102 unloads the cart 104.

At block 804, the process includes receiving one or more first signals from a first sensor (e.g., first sensor 106 of FIG. 1) and a second sensor (e.g., a second sensor 108 of FIG. 1), the second sensor 108 spaced a distance from the first sensor 106 within the cart station 116, the first sensor 106 and the second sensor 108 detecting movement of the cart 104 as the cart 104 moves out of the cart station 116 and into the unrestricted area 114. The one or more first signals may be used to determine that a distance from the first sensor 106 and the second sensor 108 to the cart 104 increases and becomes greater than, or equal to, a threshold distance (e.g., a threshold distance corresponding to the cart 104 being completely inside of an interaction area (e.g., interaction area 120 of FIG. 1)).

At block 806, the process includes determining, based at least in part on the one or more first signals, an identity of the cart 104. The identity of the cart 104 may be determined based at least in part on determining that a flat surface of the cart 104 is detected. The flat surface of the cart 104 may be detected by determining that the distance between the first sensor 106 and the cart 104 is substantially equivalent to the distance between the second sensor 108 and the cart 104 (e.g., a difference between the distance from the cart 104 to the first sensor 106, and the distance from the cart 104 to the second sensor 108, is determined to be less than a predetermined tolerance range). The first mode associated with the light curtain 110 may be changed to a second mode. The alarm system may be changed from armed to muted.

At block 808, the process includes receiving, one or more second signals from the first sensor 106 and the second sensor 108, the one or more second signals indicating that the cart 104 has passed through the light curtain 110 and is outside of the cart station 116. As the cart 104 is moved (e.g., manually pulled/pushed, or electronically/remotely controlled to move) out of the cart station 116 and into the unrestricted area 114, the distance between the cart 104 and a back fence area increases. After the cart 104 has passed through the light curtain 110 and is completely outside of the cart station 116, the one or more second signals may indicate that a distance from the first sensor 106 and the second sensor 108 to the cart 104 has increased to be greater than a threshold distance (e.g., a threshold distance corresponding to the cart 104 being completely outside of the cart station 116)

At block 810, the process includes causing, based at least in part on the one or more second signals, the second mode to change to the first mode. The alarm system may be changed from muted to armed. Should an object (e.g., a cart, an operator, an automated drive unit, an object of another type, etc.) traversing through the light curtain 110 be detected, the alarm system may be triggered.

FIG. 9 is an example system architecture for a system 900 for implementing aspects of the workspace 100 of FIG. 1, according to an embodiment of the present disclosure. The system includes an automated drive unit 938, an automated drive unit 940, sensor(s) device 944, computing device(s) 946, a logistic management system 950, and a network 942. In some embodiments, the automated drive unit 938 and the automated drive unit 940 may include similar components and/or functionality.

As illustrated, and in some embodiments, the automated drive unit 938 may include processor(s) 902, computer-readable media 904, a location component 908, a transfer mechanism 910, imaging device(s) 912, a drive unit 914, a battery 916, and/or network interface(s) 918. The processor(s) 902 may perform various functions or operations associated with sorting carts (e.g., cart 104 of FIG. 1), while the computer-readable media 904 may store instructions executable by the processor(s) 902 to store the operations described herein. The computer-readable media 904 for example may store the sortation facility data 906 for navigating and/or maneuvering with the workspace 100.

Generally, the automated drive unit 938 includes a body to provide structural support as well as an outer encasing for protecting the components of the automated drive unit 938. The automated drive unit 938 has the drive unit 914 for moving the automated drive unit 938 within the workspace 100. The drive unit 914 is configured to move the automated drive unit 938 in response to receiving instructions from the logistic management system 950, the computing device(s) 946, and/or as otherwise instructed by the processor(s) 902. In this sense, the drive unit 914 has corresponding electronics to control movement of the automated drive unit 938, which maneuvers the automated drive unit 938 within the workspace 100. In some embodiments, the drive unit 914 may include an orientation component, such as a gyroscope, and a position location component, such as a GPS (global positioning system) unit for the automated drive unit 938 to travel and/or move about the workspace 100.

The drive unit 914 may include a motor or any type of mechanical or electrical engine of sufficient size and power to move the automated drive unit 938. In some embodiments, the drive unit 914 includes a tread mechanism with a track that is mounted on, and rotated by, a set of wheels. In other implementations, the drive unit 914 may be embodied in any number of arrangements, including with wheels, digit members (e.g., leg-type members), a suspended wiring assembly, a drive unit mounted on a track, articulating arm members that move etc. In some embodiments, the drive unit 914 may facilitate one or more degrees of movement to allow rotation about a vertical axis, rotation about a tilt axis, and rotation about a pan axis. One or more motors may be further included to power the movement about the vertical, tilt, and pan axes.

The automated drive unit 938 may include the transfer mechanism 910 for moving the cart 950. In some embodiments, the transfer mechanism 910 may include a lift that extends portions of the automated drive unit 938 at various heights.

The imaging device(s) 912 may image the marker(s) within the workspace 100 to ascertain orientation and/or location. For example, the processor(s) 902 may receive image data associated with the markers and may compare the image data to a database of marker(s) stored in the computer-readable media 904. The database of marker(s) may maintain, for each maker, the position of the marker within the workspace 100. Through this comparison, the processor(s) 902 may determine an orientation and/or location within the workspace 100, which may be utilized by the automated drive unit 938 when moving within the workspace 100. For example, after determining the orientation and/or location, the processor(s) 902 may cause the automated drive unit 938 to travel to certain locations or in certain directions within the workspace 100.

Additionally, the automated drive unit 938 may include the location component 908, such as a GPS, local beacons, spatial grid systems, triangulation systems, and the like. The location component 908 may be utilized by the logistic management system 950 to track or otherwise determine a location of the automated drive unit 938 within the workspace 100. Such information may be utilized to instruct the automated drive unit 938 to move about the workspace 100. The location component 908 may also be utilized to identify a location of the automated drive unit 938 within the workspace 100.

The automated drive unit 938 further includes the battery 916 to store power used to operate the automated drive unit 938. For example, the battery 916 distributes power to the various components of the automated drive unit 938.

The automated drive unit 938 further includes the network interface(s) 918 to communicate with other moveable devices, the automated drive unit 940, and/or the logistic management system 950 via the network 942. For example, the automated drive unit 938 may communicate with the automated drive unit 940 to confirm the automated drive unit 940 is not moving toward the cart station 116. The automated drive unit 938, if determining the automated drive unit 938 and the automated drive unit 940 are both moving toward cart station 116, may generate and transmit an error signal to the logistic management system 950 and/or the automated drive unit 940, to direct the automated drive unit 940 to a different cart station. The network interface(s) 918 enables access to one or more types of networks, including wired and wireless networks. When implemented as a wireless unit, the network interface(s) 918 use an antenna to send and receive wireless signals. In some embodiments, the automated drive unit 938 may communicatively couple to other automated drive units (e.g., the automated drive units 940), and/or the logistic management system 950 using one or more communication channel(s), or network(s), such as Bluetooth (e.g., 802.11), Bluetooth Low Energy (BLE), ZigBee (e.g., 802.15.4), Z-wave, Wi-Fi, or the like.

The network 942 may represent any type of communication network, including a data network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

As illustrated, and in some embodiments, the automated drive unit 940 may include processor(s) 920, computer-readable media 922, a drive unit 932, imaging device(s) 930, a location component 926, and/or network interface(s) 936. The processor(s) 920 may perform various functions or operations associated with sorting carts (e.g., cart 104), while the computer-readable media 922 may store instructions executable by the processor(s) 920 to store the operations described herein. The computer-readable media 922 for example may store sortation facility data 924 for navigating and/or maneuvering with the workspace 100.

Generally, the automated drive unit 940 includes a body to provide structural support as well as an outer encasing for protecting the components of the automated drive unit 940. The automated drive unit 940 has the drive unit 932 for moving the automated drive unit 940 within the workspace 100. In some embodiments, the drive unit 932 may be similar to and/or include similar components and/or functionalities as the drive unit 914 of the automated drive unit 938. For example, the automated drive unit 940 may receive directional information from the drive unit 932 and may move in response to receiving instructions from the logistic management system 950, and/or as otherwise instructed by the processor(s) 920.

The imaging device(s) 930 may image the marker(s) within the workspace 100 to ascertain orientation and/or location. The computer-readable media 922 may further store the database of markers, which may be used to determine an orientation and/or location within the workspace 100. The location component 926, such as a GPS, local beacons, spatial grid systems, triangulation system, and the like may also be utilized to identify a location of the automated drive unit 940 within the workspace 100 and for use when instructing the automated drive unit 940 to travel within the workspace 100.

The automated drive unit 940 may include the transfer mechanism 928. In some embodiments, the transfer mechanism 928 may be similar to and/or include similar components as the transfer mechanism 910.

The network interface(s) 936 may permit the automated drive unit 940 to communicate with other moveable devices, such as the automated drive units 938, and/or the logistic management system 950. The battery 934 is further provided to distribute power to the various components of the automated drive unit 940.

The logistic management system 950 may include processor(s) 952, computer-readable media 954, network interface(s) 966, a destination component 968, a selection component 970, a routing component 972, a signal analysis component 974, and/or a mode switching component 976. The processor(s) 952 may perform various functions or operations associated with sorting carts, while the computer-readable media 954 may store instructions executable by the processor(s) 952 to store the operations described herein.

As used herein, a processor, such as processor(s) 902, the processor(s) 920, and/or the processor(s) 952 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The computer-readable media 904, the computer-readable media 922, and/or the computer-readable media 954 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

As illustrated the computer-readable media 954 may store several database(s), such as a cart station sensors database 956, a light curtains database 938, a carts database 960, an automated drive units database 962, and/or a floor database 964. The cart station sensors database 956 may identify the sensor(s) device 944 (e.g., first sensor 106 and second sensor 108 of FIG. 1) of cart stations and statuses of the sensor(s) device 944 of the cart stations. For example, the cart station sensors database 956 may store statuses of the sensor(s) device 944 that detect movement of objects in front of, inside of, and/or near, cart stations.

The status of the sensor(s) device 944 of the cart stations bay be used to set an alarm system for the cart station to armed or muted, or vice versa. By way of example, the alarm system may be set to be muted based at least in part on the status of the sensor(s) device 944 of the cart station being positive. The alarm system may be set to be armed based at least in part on the status of the sensor(s) device 944 of the cart station being negative.

The light curtains data base 938 may include information associated with the light curtains. For example, the light curtains data base 938 may identify light curtains and statuses of the light curtains, such as the status of the light curtain (e.g., breached or not breached). The logistic management system 950 may utilize the light curtains data base 938 for performing various operations associated with light screens used to detect movement in areas at access points for the cart stations within the workspace. For example, based on movement sensed in the access points of the cart stations, the logistic management system 950 may determine the status for the light curtains of the cart station to/from which the cart is to be moved. By way of example, the status of the one or more light receivers of a light curtain may be maintained as positive (e.g., a digital value of '1') based at least in part on the one or more light receivers of the light curtain determining that light emitted from one or more corresponding light emitters is not received. By way of example, the status of the one or more light receivers of the light curtain may be maintained as negative (e.g., a digital value of '0') based at least in part on one or more light receivers of the light curtain determining that light emitted from one or more corresponding light emitters is received.

The carts database 960 may include information associated with the carts to be sorted within the workspace. For example, the carts database 960 may identify carts that are to be sorted within the workspace. The carts database 960 may also include information associated with the cart, such as the items within the cart, the status of an order (e.g., fulfilled, shipped, etc.), identifying information of a user who purchased the items, shipping information (e.g., speed, address, etc.), and so forth. The logistic management system 950 may utilize the carts database 960 for performing various operations associated with sorting carts within the workspace. For example, knowing the destination of the carts (e.g., addresses), the logistic management system 950 may determine a corresponding cart station to/from which the cart is to be moved.

The automated drive units database 962 may store information pertaining to the automated drive unit 938 and/or the automated drive unit 940, such as their location within the workspace, their usage, battery life, current status (e.g., awaiting instructions, delivering carts, etc.), information, such as identifiers used to communicate with the automated drive unit 938 and/or the automated drive unit 940, and so forth. The logistic management system 950 may communicatively couple to the automated drive unit 938 and/or the automated drive unit 940 to receive such information. The logistic management system 950 may therefor utilize the automated drive units database 962 for managing or otherwise instructing the automated drive unit 938 and/or the automated drive unit 940.

The floor database 964 may include information about the workspace 100. For example, the floor database 964 may store information associated with locations of packages used to fill the carts, the location of the carts 104 and so forth. Such information may be used by the logistic management system 950 when directing or instructing the automated drive unit 938 and/or the automated drive unit 940 to move about the workspace.

The network interface(s) 966 may permit the logistic management system 950 to receive sensor data from the sensor(s) device 944. The sensor data that is received via the network interface(s) 966 may be routed to, and stored in, the cart station sensors database 956. The network interface(s) 966 may permit the logistic management system 950 to communicate with the computing device(s) 946, and with moveable devices, such as the automated drive unit 938 and/or the automated drive unit 940.

The destination component 968 may determine the destination of carts by utilizing, for example, the carts database 960. The selection component 970 may select the automated drive unit 938 and/or the automated drive unit 940 for transferring carts (e.g., the automated drive units 938 and/or 940 may be selected to load and/or unload the carts). In some embodiments, the selection component 970 may select the automated drive unit 938 and/or the automated drive unit 940, or the carts 104 associated therewith, based at least in part on the address of the carts (i.e., as determined by the destination component 968).

The routing component 972 may determine paths or routes of automated drive units (e.g., the automated drive unit 938 and/or the automated drive unit 940). For example, after determining the cart station 116 in which the cart is to be delivered, the routing component 972 may determine a location of the cart station 116 within the workspace and for use in instructing the automated drive unit 938 and/or the automated drive unit 940. The routing component 972 may also determine the paths that the automated drive unit 938 and/or the automated drive unit 940 are to move along to transfer carts, eject carts, receive carts, and so forth. For example, after receiving a cart that is to be unloaded in a cart station, the routing component 972 may determine a route or location within the restricted area 112 in which the automated drive unit 938 and/or the automated drive unit 940 is to travel. For example, using information about the restricted area 112 (e.g., cart stations), the routing component 972 may instruct the automated drive unit 938 and/or the automated drive unit 940 to travel to the cart station 116. Similarly, after loading a cart in a cart station, the routing component 972 may determine a route for the automated drive unit 938 and/or the automated drive unit 940 to travel to eject the cart. Accordingly, the logistic management system 950 may include components for continuously instructing the automated drive unit 938 and/or the automated drive unit 940 to transfer carts.

The signal analysis component 974 may analyze sensor data stored in the cart station sensors database 956. By way of example, the signal analysis component 974 may determine that sensor data indicates a cart is being moved into a cart station, based at least in part on a status of sensor(s) device 944 (e.g., the first sensor device 106 and the second sensor device 108) of the cart station being maintained as positive (e.g., a digital value of '1'). The status of sensor(s) device 944 of the cart station may be maintained as positive further based at least in part on a distance from the cart to the sensor(s) device 944 being determined to indicate the cart is being moved into, or out of, the cart station (e.g., the distance is between a threshold distance corresponding to the cart being completely inside of the interaction area and a threshold distance corresponding to the cart being completely outside of the interaction area). The status of the sensor(s) device 944 of the cart station may be changed from positive to negative if the cart is completely inside of the cart station, based at least in part on input from a user 948 (e.g., input from a button in the cart station and/or the computing device 946), while the cart station is being operated to load the cart.

By way of example, the signal analysis component 974 may determine that sensor data indicates no cart is being moved into, or out of, the cart station, based at least in part on a status of sensor(s) device 944 (e.g., the first sensor device 106 and the second sensor device 108) of a cart station being maintained as negative (e.g., a digital value of '0'). The status of the sensor(s) device 944 of the cart station may be negative based at least in part on the sensor(s) device 944 of the cart station determining that an object is moving in front of a first sensor of the cart station but not in front of a second sensor of the cart station, or vice versa. The status of the sensor(s) device 944 of the cart station may be negative based at least in part on the sensor(s) device 944 of the cart station determining that an object is located and/or moving in front of both of the sensor(s) device 944, and further based at least in part on determining that a distance between the object and the first sensor of the cart station is different from a distance between the object and the second sensor of the cart station (e.g., a difference between the distance from the object to the first sensor, and the distance from the object to the second sensor, is determined to be greater than, or equal to, a predetermined tolerance range). The status of the sensor(s) device 944 of the cart station may be changed from negative to positive if the cart is completely outside of the cart station, based at least in part on input from a user 948 (e.g., input from the button in the cart station and/or the computing device 946), while the cart station is being operated to unload the cart.

The mode switching component 976 may change modes of alarm systems associated with light curtains based on output of the signal analysis component 974. The mode switching component 976 may provide a first mode for a cart station causing an alarm system associated with a light curtain to be armed, and a second mode for the cart station causing the alarm system to be muted. When the alarm system is armed, breach of the light curtain would trigger the alarm system (e.g., activation of a siren, lights, etc.) and, when the alarm system is muted, the alarm system will not be triggered when the light curtain is breached. The mode switching component 976 may provide the first mode for a cart station based at least in part on the mode switching component 976 indicating that sensor data for sensor(s) device 944 (e.g., the first sensor device 106 and the second sensor device 108) of the cart station is negative (e.g., a digital value of '0' corresponding to no cart being moved into the cart station). The mode switching component 976 may provide the second mode for the cart station based at least in part the mode switching component 976 indicating that the sensor data for the sensor(s) device 944 (e.g., the first sensor device 106 and the second sensor device 108) of a cart station is positive (e.g., a digital value of '1' corresponding to a cart being moved into the cart station).

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a cart station, within a restricted area, at which carts that transport items are moved between the restricted area and an unrestricted area, the restricted area including a plurality of automated drive units that move the carts between different locations;
   a light curtain that is adjacent to the cart station and that separates the restricted area from the unrestricted area, the carts entering and exiting the restricted area through the light curtain;
   a first sensor and a second sensor spaced apart from the first sensor within the cart station, the first sensor and the second sensor detecting movement of the carts as the carts approach, and move away from, the cart station from the restricted area and the unrestricted area; and
   a computing device comprising:
      one or more processors; and
      one or more computer-readable media storing computer-executable instructions that, when executed by the one or more processors, cause the one or more processors to perform acts comprising:
         maintaining a first mode associated with the light curtain, the first mode causing an alarm system associated with the light curtain to remain armed;
         receiving one or more first signals from the first sensor and the second sensor, the one or more first signals indicating detection of a cart moving toward the cart station from the unrestricted area;
         determining, based on the one or more first signals, an identity of the cart;
         causing, based on the identity of the cart, the first mode to change to a second mode associated with the light curtain, the second mode causing the alarm system to be muted;
         receiving, one or more second signals from the first sensor and the second sensor, the one or more second signals indicating that the cart has passed through the light curtain and is within the cart station; and
         causing, based on the one or more second signals, the second mode to change to the first mode.

2. The system of claim 1, wherein causing the first mode to change to the second mode is further based on the one or more first signals indicating that a distance from at least one of the first sensor or the second sensor to the cart is less than, or equal to, a threshold distance.

3. The system of claim 1, wherein the one or more first signals indicate a first distance from a surface of the cart station at the first sensor to the cart and a second distance from the surface of the cart station at the second sensor to the cart, wherein determining the identity of the cart further comprises determining that a difference between the first distance and the second distance is less than a predetermined tolerance range.

4. The system of claim 1, wherein:
   the first sensor and the second sensor are positioned at a surface of the cart station;
   the one or more first signals comprise a third signal from the first sensor and a fourth signal from the second sensor, the third signal indicating a first distance from the surface of the cart station to the cart and the fourth signal indicating a second distance from the surface of the cart station to the cart;
   causing the first mode to change to the second mode is based on the first distance and the second distance being less than, or equal to, a first threshold distance;
   the one or more second signals comprise a fifth signal from the first sensor and a sixth signal from the second sensor, the fifth signal indicating a third distance from the surface of the cart station to the cart and the sixth signal indicating a fourth distance from the surface of the cart station to the cart; and
   causing the second mode to change to the first mode is based on the third distance and the fourth distance being less than a second threshold distance.

5. The system of claim 1, wherein the cart is a first cart that is loaded onto an automated drive unit and removed from the cart station, and the identity of the first cart is a first identity, and wherein the acts further comprise:
   receiving one or more third signals from the first sensor and the second sensor, the one or more third signals indicating detection of a second cart in the cart station;

determining, based on the one or more third signals, a second identity of the second cart;

maintaining, based on the one or more third signals, the first mode associated with the light curtain;

receiving one or more fourth signals from the first sensor and the second sensor;

determining, based on the one or more fourth signals, the second identity of the second cart;

causing, based on the second identity of the second cart and the one or more fourth signals indicating detection of the second cart moving away from the cart station and toward the unrestricted area, the first mode to change to the second mode;

receiving one or more fifth signals from the first sensor and the second sensor, the one or more fifth signals indicating that the second cart has passed through the light curtain and is outside of the cart station; and causing, based on the one or more fifth signals, the second mode to change to the first mode.

6. A method comprising:

maintaining a first mode associated with an entry to an item transport station at which one or more item transport mechanisms are transported between different locations;

receiving one or more first signals from at least one of a first sensor or a second sensor associated with the item transport station, the at least one of the first sensor and the second sensor detecting movement of an item transport mechanism of the one or more item transport mechanisms as the item transport mechanism approaches, or moves away from, the item transport station;

causing, based at least in part on the one or more first signals, the first mode to change to a second mode associated with the entry;

receiving one or more second signals from at least one of the first sensor or the second sensor, the one or more second signals indicating that the item transport mechanism has passed through the entry; and causing, based at least in part on the one or more second signals, the second mode to change to the first mode.

7. The method of claim 6, further comprising:

causing an alarm system associated with the entry to remain armed based at least in part on the first mode being maintained; and causing an alarm system associated with the entry to remain muted based at least in part on the first mode being changed to the second mode.

8. The method of claim 6, wherein causing the first mode to change to the second mode is further based at least in part on the one or more first signals indicating that a distance from at least one of the first sensor or the second sensor to the item transport mechanism is less than, or equal to, a threshold distance corresponding to the item transport mechanism being moved toward the entry of the item transport station and into of the item transport station.

9. The method of claim 6, wherein causing the first mode to change to the second mode is further based at least in part on the one or more first signals indicating that a distance from at least one of the first sensor or the second sensor to the item transport mechanism is greater than, or equal to, a threshold distance corresponding to the item transport mechanism being moved toward the entry of the item transport station and out of the item transport station.

10. The method of claim 6, wherein:

the first sensor and the second sensor are positioned at a surface of the item transport station;

the one or more first signals comprise a third signal from the first sensor and a fourth signal from the second sensor, the third signal and indicating a first distance from the surface of the item transport station to the item transport mechanism and the fourth signal indicating a second distance from the surface of the item transport mechanism station to the item transport mechanism; and causing the first mode to change to the second mode further comprises causing the first mode to change to the second mode based at least in part on the first distance and the second distance being less than, or equal to, a threshold distance corresponding to the item transport mechanism being moved toward the entry of the item transport station and into the item transport station.

11. The method of claim 6, wherein:

the one or more second signals comprise a third signal from the first sensor and a fourth signal from the second sensor, the third signal indicating a first distance from a surface of the item transport station to the item transport mechanism and the fourth signal indicating a second distance from the surface of the item transport mechanism station to the item transport mechanism; and causing the second mode to change to the first mode further comprises causing the second mode to change to the first mode based at least in part on the first distance and the second distance being greater than, or equal to, a threshold distance corresponding to the item transport mechanism being moved toward the entry of the item transport station and out of the item transport station.

12. The method of claim 6, wherein:

the one or more first signals indicate a first distance from a surface of the item transport station at the first sensor to the item transport mechanism; and a second distance from the surface of the item transport station at the second sensor to the item transport mechanism; and causing the first mode to change to the second mode further comprises determining that a difference between the first distance and the second distance is less than a predetermined tolerance range.

13. The method of claim 6, wherein the item transport mechanism is a first item transport mechanism that is loaded onto a first automated drive unit and removed from the item transport station, the method further comprising:

receiving, from at least one of the first sensor or the second sensor, one or more third signals and one or more fourth signals, the one or more third signals and the one or more fourth signals indicating detection of a second item transport mechanism, the second item transport mechanism being unloaded by a second automated drive unit in the item transport station;

determining, based at least in part on the one or more third signals and the one or more fourth signals, an identity of the second item transport mechanism;

causing, based at least in part on the one or more third signals and the identity, the first mode associated with the entry to change to the second mode; and causing, based at least in part on the one or more fourth signals and the identity, the second mode to change to the first mode, the one or more fourth signals indicating that the item transport mechanism has passed through the entry.

14. A system comprising:
an item transport station, within an area including a plurality of automated drive units that move item transport mechanisms between different locations;
a plurality of sensors within the item transport station, the plurality of sensors detecting movement of the item transport mechanisms; and
a computing device comprising:
one or more processors; and
one or more computer-readable media storing computer-executable instructions that, when executed by the one or more processors, cause the one or more processors to perform acts comprising:
determining an item transport mechanism is moving toward, or away from, the item transport station, based at least in part on the plurality of sensors detecting movement of the item transport mechanism; and
causing, based at least in part on the item transport mechanism being determined to be moving toward, or away from, the item transport station, a first mode associated with an entry of the item transport station to change to a second mode.

15. The system of claim 14, wherein causing the first mode associated to change to the second mode further comprises:
receiving one or more first signals from at least one of the plurality of sensors;
causing an alarm system associated with an entry to remain armed based at least in part on the one or more first signals, the alarm system remaining armed until one or more second signals are received from the at least one of the plurality of sensors.

16. The system of claim 14, wherein the plurality of sensors comprises a first sensor of a first type and a second sensor of a second type, and the first type is different from the second type.

17. The system of claim 14, wherein the plurality of sensors comprises a first sensor at an upper portion of an internal surface of the item transport station, and a second sensor at a lower portion of the internal surface of the item transport station with respect to the upper portion.

18. The system of claim 14, wherein the item transport mechanism approaching or receding from the item transport station is carried by a drive unit.

19. The system of claim 14, wherein the plurality of sensors comprises a first sensor directed at a first angle relative to a horizontal axis, and a second sensor at a second angle related to the horizontal axis, and the first angle is different from the second angle.

20. The system of claim 14, wherein the plurality of sensors comprises a first sensor configured to scan a first area of a boundary region of the item transport station, and a second sensor configured to scan a second area of the boundary region of the item transport station, and a first size of the first area is different from a second size of the second area.

* * * * *